(12) United States Patent
Taniuchi et al.

(10) Patent No.: US 11,836,322 B2
(45) Date of Patent: Dec. 5, 2023

(54) ELECTRONIC DEVICE AND INPUT METHOD FOR THE SAME

(71) Applicant: GOERTEK TECHNOLOGY CO., LTD., Qingdao (CN)

(72) Inventors: Hirotada Taniuchi, Qingdao (CN); Katsunori Ishimiya, Qingdao (CN); Kenichiro Kodama, Qingdao (CN)

(73) Assignee: GOERTEK TECHNOLOGY CO. LTD., Qingdao (CN)

( * ) Notice: Subject to any disclaimer, the term of this patent is extended or adjusted under 35 U.S.C. 154(b) by 448 days.

(21) Appl. No.: 17/043,323

(22) PCT Filed: Dec. 30, 2019

(86) PCT No.: PCT/CN2019/129858
§ 371 (c)(1),
(2) Date: Sep. 29, 2020

(87) PCT Pub. No.: WO2021/134182
PCT Pub. Date: Jul. 8, 2021

(65) Prior Publication Data
US 2022/0300097 A1 Sep. 22, 2022

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 3/0414* (2013.01)

(58) Field of Classification Search
None
See application file for complete search history.

(56) References Cited

U.S. PATENT DOCUMENTS

| 8,564,313 B1* | 10/2013 | Ryshtun | G06F 3/04166 324/678 |
| 2009/0015564 A1 | 1/2009 | Ye et al. | |
| 2009/0085865 A1* | 4/2009 | Fattah | G06F 1/1684 702/139 |

(Continued)

FOREIGN PATENT DOCUMENTS

| CN | 101000529 A | 7/2007 |
| CN | 104823138 B | 10/2017 |

(Continued)

OTHER PUBLICATIONS

Chinese Office Action, dated Apr. 2, 2022, from China Application No. 201980061727.1.

(Continued)

*Primary Examiner* — Christopher R Lamb
(74) *Attorney, Agent, or Firm* — Workman Nydegger

(57) ABSTRACT

An electronic device includes a housing and a strain sensor group attached on a wall of the housing. The strain sensor group includes at least one strain sensor each configured to detect deformation of the wall in a single direction. When a user presses the housing, the strain sensor group detects deformation of the wall and generates a detection signal indicating direction and magnitude of deformation of the wall. At least one analog-to-digital converter converts the detection signal into a digital signal, and a controller triggers a first event in the electronic device based on the digital signal.

13 Claims, 22 Drawing Sheets

(56) References Cited

U.S. PATENT DOCUMENTS

| | | | |
|---|---|---|---|
| 2015/0261371 A1 | 9/2015 | Li | |
| 2016/0216164 A1 | 7/2016 | Teil | |
| 2017/0060178 A1* | 3/2017 | Ito | A61B 5/6844 |
| 2017/0075465 A1 | 3/2017 | Pedder et al. | |
| 2017/0082433 A1 | 3/2017 | Huo et al. | |
| 2017/0343429 A1 | 11/2017 | Wu | |
| 2018/0232089 A1* | 8/2018 | Ozawa | G06F 1/1626 |
| 2018/0299996 A1* | 10/2018 | Kugler | G06F 3/017 |
| 2019/0073064 A1 | 3/2019 | Sheng et al. | |
| 2019/0129557 A1* | 5/2019 | Liu | G06F 3/04144 |
| 2020/0100013 A1* | 3/2020 | Harjee | H04R 1/1091 |

FOREIGN PATENT DOCUMENTS

| | | |
|---|---|---|
| CN | 107436204 A | 12/2017 |
| CN | 207248093 U | 4/2018 |
| CN | 108627295 A | 10/2018 |
| CN | 209857841 U | 12/2019 |
| CN | 111480058 A | 7/2020 |

OTHER PUBLICATIONS

International Search Report, China international search authority, for PCT/CN2019/129858 filed Dec. 30, 2019, dated Sep. 27, 2020.

\* cited by examiner

| Deformation case | Detection signal to ADC 302 | io0 | io1 |
|---|---|---|---|
| No deformation (neither deformation case 2a nor deformation case 2b) | Between $V_{H1}$ and $V_{L1}$ | L | H |
| Deformation case 2a | Lower than $V_{L1}$ | L | L |
| Deformation case 2b | Higher than $V_{H1}$ | H | H |

Fig. 4

| Deformation case | Detection signal to ADC 502 | io0 | io1 | io2 |
|---|---|---|---|---|
| No deformation | Between $V_{H1}$ and $V_{L1}$ | L | H | L |
| Deformation case 3a | Lower than $V_{L1}$ | L | L | L |
| Deformation case 3b | Between $V_{H1}$ and $V_{H2}$ | H | H | L |
| Deformation case 3c | Higher than $V_{H2}$ | H | H | H |

Fig. 6

| Deformation case | Detection signal to ADC 803 | Detection signal to ADC 813 | io0 | io1 | io2 | io3 |
|---|---|---|---|---|---|---|
| No deformation | Between $V_{H1}$ and $V_{L1}$ | Between $V_{H2}$ and $V_{L2}$ | L | H | L | H |
| Deformation case 4a | Lower than $V_{L1}$ | Between $V_{H1}$ and $V_{L1}$ | L | L | L | H |
| Deformation case 4b | Between $V_{H1}$ and $V_{L1}$ | Lower than $V_{L2}$ | L | H | L | L |
| Deformation case 4c | Higher than $V_{H2}$ | Higher than $V_{H2}$ | H | H | H | H |

Fig. 9

| Deformation case | Detection signal to ADC 1202 | Detection signal to ADC 1212 | Detection signal to ADC 1222 | Detection signal to ADC 1232 | io0 | io1 | io2 | io3 | io4 | io5 | io6 | io7 |
|---|---|---|---|---|---|---|---|---|---|---|---|---|
| None | Between $V_{H1}$ and $V_{L1}$ | Between $V_{H2}$ and $V_{L2}$ | Between $V_{H3}$ and $V_{L3}$ | Between $V_{H4}$ and $V_{L4}$ | L | H | L | H | L | H | L | H |
| 5a | Lower than $V_{L1}$ | Between $V_{H2}$ and $V_{L2}$ | Between $V_{H3}$ and $V_{L3}$ | Between $V_{H4}$ and $V_{L4}$ | L | L | L | H | L | H | L | H |
| 5b | Between $V_{H1}$ and $V_{L1}$ | Lower than $V_{L2}$ | Between $V_{H3}$ and $V_{L3}$ | Between $V_{H4}$ and $V_{L4}$ | L | H | L | L | L | H | L | H |
| 5c | Between $V_{H1}$ and $V_{L1}$ | Between $V_{H2}$ and $V_{L2}$ | Lower than $V_{L3}$ | Between $V_{H4}$ and $V_{L4}$ | L | H | L | H | L | L | L | H |
| 5d | Between $V_{H1}$ and $V_{L1}$ | Between $V_{H2}$ and $V_{L2}$ | Between $V_{H3}$ and $V_{L3}$ | Lower than $V_{L4}$ | L | H | L | H | L | H | L | L |
| 5e | Higher than $V_{H1}$ | Higher than $V_{H2}$ | Higher than $V_{H3}$ | Higher than $V_{H4}$ | H | H | H | H | H | H | H | H |

Fig. 13

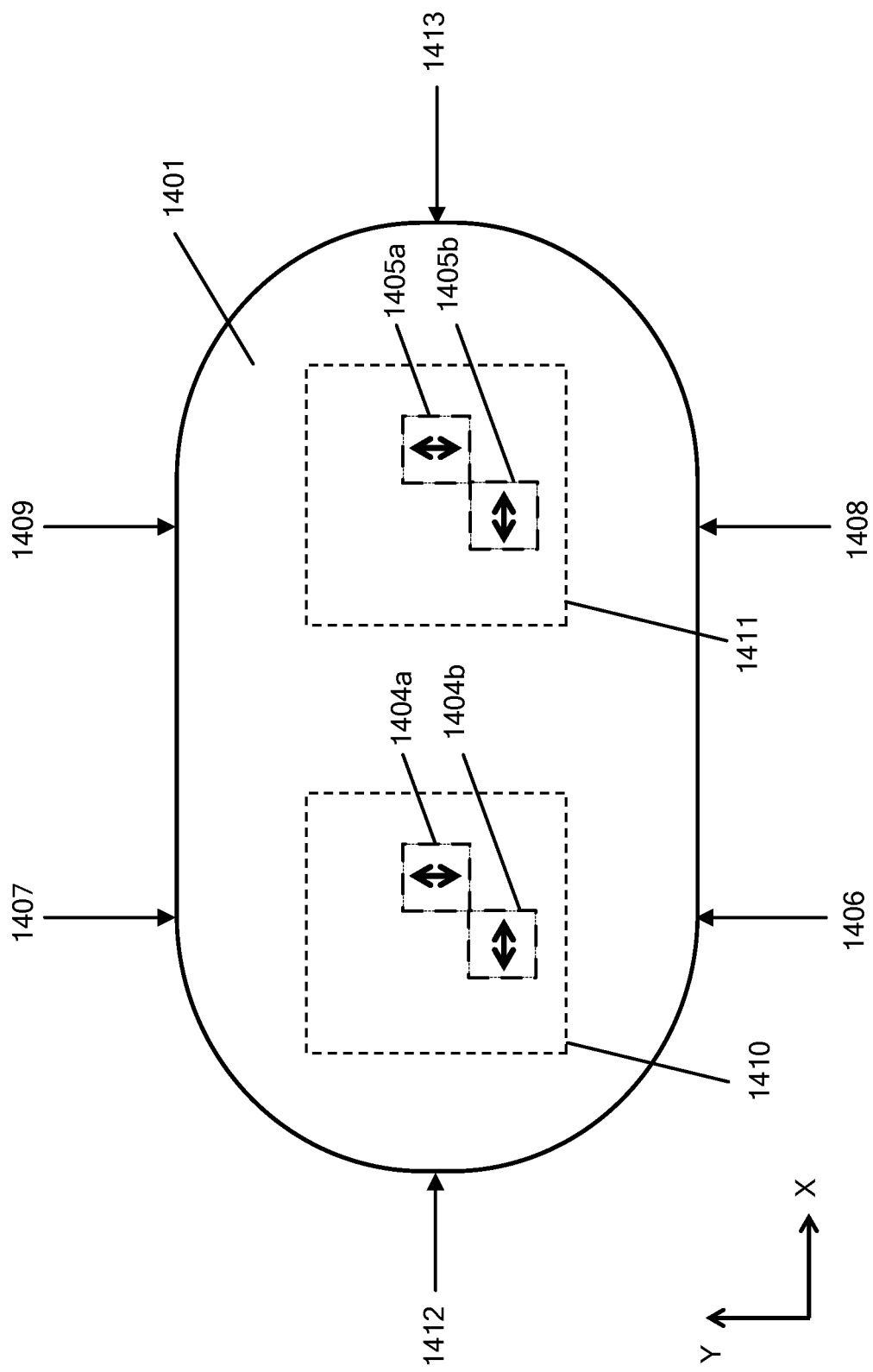

ELECTRONIC DEVICE AND INPUT METHOD FOR THE SAME

CROSS-REFERENCE TO RELATED APPLICATIONS

This application is the US national phase of international application No. PCT/CN2019/129858, titled "ELECTRONIC DEVICE AND INPUT METHOD FOR THE SAME", filed on Dec. 30, 2019, which is incorporated herein by reference in its entirety.

FIELD

The present disclosure relates to the technical field of electronic devices, in particular to a method of detecting user inputs through deformation of a housing of an electronic device, and an electronic device using the method.

BACKGROUND

Capacitive touch is a commonly used input mechanism in electronic devices, with which a user can input a command by performing touch operations, such as double click, long press or slide, on a touch-sensitive surface. In order to cause an electronic device to act in response to different user commands, a variety of touch patterns are configured in a capacitive touch electronic device. For example, a user may double click a touch screen of a cellphone to zoom in an image displayed thereon, long press an application icon to pop out a menu of operation options, or slide on the touch screen to unlock the device. In addition to such single-finger operations, the device may also support multi-touch by which the user may, for example, slide on the touch screen with two fingers to switch between applications or pinch on the touch screen with three or more fingers to return home screen.

The functionality of capacitive touch introduces various command patterns for a user to operate an electronic device, while the large number of commands may cause complications and trouble to the user, making it difficult for him to learn and use the commands and thus reducing usability of the functionality. Besides, as there is less space for a control interface in an electronic device with a smaller size, such operations requiring large space as slide or multi-touch operations cannot be accommodated in small devices.

SUMMARY

The present disclosure provides an electronic device and an input method for an electronic device.

The electronic device includes a housing has a wall that is deformable in different directions, and a strain sensor group is attached on the wall of the housing. The strain sensor group includes at least one strain sensor, and each strain sensor detects deformation in a single direction. When a force is applied on the housing, the first wall is deformed corresponding to the force applied. The at least one strain sensor group detects direction and magnitude of the deformation of the wall and generates a detection signal indicating the direction and the magnitude of the wall. The detected direction of each strain sensor may be a deformation-sensitive direction thereof.

The electronic device includes at least one analog-to-digital converter, which has an input terminal connected to an output terminal of the at least one strain sensor and has an output terminal connected to a controller, the at least one analog-to-digital converter is configured to convert the detection signal indicating the direction and the magnitude of the wall from the at least one strain sensor into a digital signal. The controller triggers a first event in the electronic device based on the digital signal.

The strain sensor group may include two or more strain sensors configured to detect deformation in respective directions that are different than each other. The detection directions of the strain sensors may be evenly distributed circumferentially, and an angle between each two adjacent ones of the detection directions in the strain sensor group is 180/N degrees, where N is the number of the strain sensors in the strain sensor group.

The at least one strain sensor may be attached on inside of the wall.

The number of the at least one strain sensor may be one, and the one strain sensor may be arranged at the center of the wall.

The wall may have a first portion with a first thickness and a second portion with a second thickness, the first thickness is smaller than the second thickness, and the at least one strain sensor group is attached on the first portion of the first wall. The first portion may be configured to have various shapes in order to accommodate the at least one strain sensor. The shape of the first portion may be a cross shape with crossing at the center of the first wall of the housing.

The electronic device may further include a deformation detection enabling sensor connected to the controller and configured to detect whether the electronic device is worn by a user. Only in a case that the electronic device is worn by the user, the detection of deformation of the wall is enabled.

The deformation detection enabling sensor may be a temperature sensor, an infrared sensor or a capacitive sensor. In a case that the deformation detection enabling sensor is a capacitive sensor, the capacitive sensor is spaced from the strain sensor group attached on the wall by a predetermined distance and further configured to detect a touch input on the wall by a user, and the controller is configured to trigger a second event in the electronic device based on a combination of deformation detected by the strain sensor group and the touch input detected by the capacitive sensor. The wall, the strain sensor group and the capacitive sensor are located in the sequence as listed.

The number of strain sensor group may be more than one, and the more than one strain sensor group is arranged on the wall in a uniform manner.

Each of the at least one analog-to-digital converter may include at least two comparators having different reference voltages, and output at least two digital signals to the controller, and the controller may be configured to determine one of deformation cases according to a correspondence relationship between the deformation cases and the at least two digital signals, and trigger the first event corresponding to the deformation case.

The electronic device may further include a low power microcontroller unit connected between the at least one analog-to-digital converter and the controller, and the low power microcontroller unit may be configured to process the digital signal and transmit the processed digital signal to the controller, where the controller triggers the first event based on the processed digital signal.

The wall of the housing of the electronic device may be made of a metal material such as one or more of stainless steel, aluminum, copper or magnesium alloy, and may be connected to a grounding terminal of a printed circuit board (PCB) of the electronic device. The wall of the housing may be electronically connected to the grounding terminal by means of a spring, a pogo pin connector, crimping, snap fit connection, welding, a screw or soldering.

The wall of the housing of the electronic device may be electronically connected to the grounding terminal by an inductor, where the inductor has a first terminal connected to the wall of the housing and a second terminal connected to the grounding terminal of the PCB. An inductance of the inductor may be lower than 1 µH.

The electronic device may further include a radio frequency (RF) circuit, and the RF circuit may be electrically connected to the wall of the housing via a connection point between the first terminal of the inductor and the wall of the housing.

The electronic device may further include a capacitor electronically connected across the first terminal and the second terminal of the inductor.

In the input method for an electronic device, a strain sensor group detects a deformation of a wall of a housing of the electronic device. The strain sensor group includes at least one strain sensor each configured to detect the deformation of the wall in a single direction, the deformation involves a direction and a magnitude, and the direction is a deformation-sensitive direction. The strain sensor group generates a detection signal indicating the direction and the magnitude of the wall. At least one analog-to-digital converter converts the detection signal from the at least one strain sensor into a digital signal. A controller triggers a first event in the electronic device based on the digital signal.

In the input method, a deformation detection enabling sensor may detect whether the electronic device is worn by a user. Only in a case that the electronic device is worn by the user, the detection of deformation of the wall is enabled.

In the input method, the deformation detection enabling sensor may be a capacitive sensor, the capacitive sensor is further configured to detect a touch input on the wall by a user, and the controller may trigger a second event in the electronic device based on a combination of deformation detected by the strain sensor group and the touch input detected by the capacitive sensor.

In the input method, the number of the digital signal is at least two, and in this case, the controller determines one of deformation cases according to a correspondence relationship between the deformation cases and the at least two digital signals and triggers the event corresponding to the deformation case.

It should be noted that both the foregoing general description and the following detailed description are for purpose of example and explanation and do not limit the present disclosure in any form.

BRIEF DESCRIPTION OF THE DRAWINGS

In order to more clearly describe the technical solutions of the present disclosure, the drawings involved in description of the embodiments according to the present disclosure are briefly introduced. Apparently, the drawings only illustrate some embodiments of the present disclosure, and other drawings may be obtained by those skilled in the art based on the appended drawings without any inventive efforts.

FIG. 4 shows a correspondence relationship between deformation cases and inputs to comparator group shown in FIG. 3;

FIG. 6 shows a correspondence relationship between deformation cases and inputs to comparator group shown in FIG. 5;

FIG. 9 shows a correspondence relationship between deformation cases and input to comparator group shown in FIG. 8;

FIG. 13 shows a correspondence relationship between deformation cases and inputs to comparator group shown in FIG. 12;

FIG. 14 shows an arrangement of two strain sensor groups each including two strain sensors in an electronic device according to an embodiment of the present disclosure;

DETAILED DESCRIPTION OF THE EMBODIMENTS

An input method for an electronic device is provided according to some embodiments of the present disclosure. The method may be applied to an electronic device having a housing. The housing has a wall that is deformable in different directions, and at least one strain sensor group is attached on the wall, e.g., on the inside of the wall. Each strain sensor group includes at least one strain sensor, and each strain sensor detects deformation in a single direction.

When a user operates the electronic device, he may input a command by pressing the housing. The wall with the at least one strain sensor group attached thereon is deformed, and the deformation of the wall is detected by the at least one strain sensor group. In addition to magnitude, direction of the deformation can also be detected by the at least one strain sensor group. Multiple strain sensors in the stain sensor group can detect deformation in multiple directions. A detection signal indicating the direction and the magnitude of the deformation may be generated accordingly by the at least one strain sensor group, and a different detection signal corresponds to a different user input. In this way, the electronic device can trigger a first event based on the user input.

The electronic device may be various devices which have a housing, such as but not limited to, earphone, watch, eyeglass, necklace, ring, keyboard, mouse, laser pointer, audio device, household appliance (for example, refrigerator). A user can input commands to these devices by pressing a housing thereof.

Figure 1:
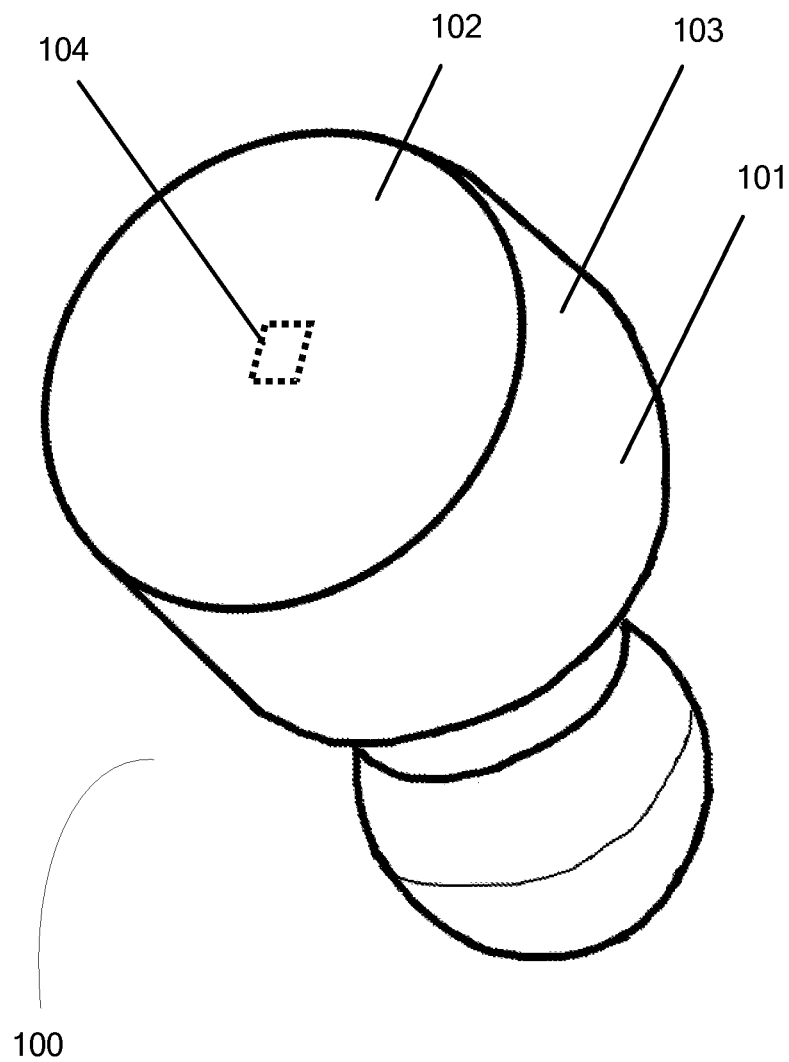
FIG. 1 is schematic view of an electronic device according to an embodiment of the present disclosure.

FIG. 1 is a schematic view of an electronic device according to an embodiment of the present disclosure. As shown in FIG. 1, the electronic device 100 has a housing 101. The housing 101 has a wall including a first wall 102 and a second wall 103 which form a part of the housing, and the first wall 102 and the second wall 103 may be formed to be one common part or separated parts. In case of separate parts, the first wall 102 and the second wall 103 are physically connected to each other, so that the first wall 102 is deformed when the user applies a force on the second wall 103.

The first wall 102 may be a wall of the housing which the user can easily contact and is thus convenient for operation of the user. In an embodiment, the first wall 102 may be a top wall of the housing and the second wall 103 may be a side wall of the housing, as is shown in FIG. 1. In an example, the electronic device may be an earphone. When the user wears the earphone, the top wall may have a surface facing away from an ear of the user, by which the user can easily operate and control the earphone by pressing the top wall. In other embodiments, the first wall and the second wall may be configured otherwise. For example, in an embodiment, the electronic device may be a cellphone, the first wall may be a front portion of a housing of the cellphone facing the user and the second wall may be a side portion of the housing of the cellphone by which the user holds the cellphone. In another example, the electronic device may be a watch, the first wall may be a front cover of the watch that faces the user, and the second wall may be a side cover of the watch where a crown of the watch is located. In a third example, the electronic device may be a laser pointer, the first wall may be a bottom surface of the laser pointer, and the second wall may be a cylindrical side surface of the laser pointer. In the examples above, when a force is applied on the second wall 103, the applied force can be transmitted to the first wall 102 so as to deform the first wall 102, and accordingly, forces applied in different directions on the second wall 103 may cause the first wall to deform. It is both noted and well understood that the foregoing embodiments are only listed for illustrating some exemplary embodiments of the present disclosure and does not intend to limit the disclosure in any form.

In an embodiment, the housing 101 of the electronic device may be made from any one of plastic, glass, metal, wood, ceramic and leather or from any combination of the materials as listed. Herein, only some materials are listed, whereas other suitable materials that are deformable can also be employed when forming the housing.

In a case that the first wall and the second wall are formed to be one common part, for example, the first and second walls are formed during one process, they may be made from one common deformable material, such as one of those as listed above. In a case that the first wall and the second wall are formed to be separated parts, they may be made from one common deformable material or from different materials. For example, the first wall may be formed to have less rigidity than the second wall, and in this way, forces applied on the second wall can be effectively transmitted to act on the first wall to deform the first wall. In another embodiment, the first wall may have rigidity equal to that of the second wall, or the first wall is more rigid than the second wall. Despite of whether the first wall is more rigid than the second wall or the other way around, the first wall will be deformed when the user presses the second wall with consideration taken in detection sensitivity. The rigidity of the first wall or the second wall may affect intensity of a force required to be applied on the first or second wall, which plays a role in detection sensitivity. In an embodiment, the first wall is made from metal, and the second wall is made from plastic.

The electronic device further includes at least one strain sensor group 104 attached on the first wall 102, as is shown in FIG. 1. Each strain sensor group includes at least one strain sensor, and each strain sensor detects deformation of the first wall 102 in a single direction. For example, the strain sensor may be more sensitive to deformation of the housing in one direction than in the other directions, where in some embodiments the identified direction may be referred as a deformation-sensitive direction of the strain sensor, and in a case that a strain sensor group includes multiple strain sensors, the multiple strain sensors are arranged in such a manner that the strain sensors detects deformation in different directions. In a case that the earphone includes multiple strain sensor groups, the strain sensor groups may be arranged on the first wall in a uniform manner. For example, the individual strain sensor groups may have the same number of strain sensors, and deformation-sensitive directions of the individual strain sensors are the same as each other. Alternatively, the individual strain sensor groups may have different numbers of strain sensors, and deformation-sensitive directions of strain sensors in the individual strain sensor groups are different from each other. Or, some of the strain sensor groups may have the same number of strain sensors and the same arrangement of deformation-sensitive directions, and the others don't. Or, some of the strain sensor groups may have the same number of strain sensors but have different arrangements of deformation-sensitive directions. The numbers and deformation-sensitive directions of strain sensors in the strain sensor groups may be configured according to practical design requirements. For example, more subtle operations may be required on some portion of the first wall, and in this case, a strain sensor group in this portion may have more strain sensors. Other configurations of the strain sensor groups may be made based on those as provided above, which is not limited in the present disclosure.

As each strain sensor detects deformation in a single direction, a direction of deformation when the user presses the housing can be detected in addition to a magnitude of the deformation by identifying a source of a detection signal. The at least one strain sensor group generates a detection signal indicating the direction and the magnitude of the deformation.

In an embodiment, the at least one strain sensor in the strain sensor group 104 may be distributed in an array containing the center of the inside of the first wall. For example, the strain sensor group may have only one strain sensor, and the one strain sensor is located at the center of the first wall, or the strain sensor group may include two or more strain sensors, the strain sensors may be distributed in an array, and the center of the first wall is located within the array.

The electronic device may further include a controller. The controller may determine a deformation case based on the direction and the magnitude of the deformation and generate a command to trigger a first event corresponding to the deformation case. A correspondence relationship between the direction and magnitude of deformation and a deformation case may be pre-configured in the earphone, and the controller of the earphone may determine the deformation case based on the correspondence relationship. After the deformation case is determined, the controller generates a command corresponding to the deformation case and triggers the first event corresponding to the deformation case. Similarly, a correspondence relationship between the deformation case and the first event to be triggered may be pre-configured in the earphone, by which a corresponding event can be triggered based on such correspondence relationship.

For example, when the user puts his finger on the first wall and pushes downward from top, the strain sensor group 104 detects direction and magnitude of the deformation of the first wall, and the controller determines a deformation case based on the direction and magnitude of the deformation and triggers the first event corresponding to the deformation case. For example, the user may want to pause when he is listening to music from a player by the earphone, and in this case, he may press on the first wall. The strain sensor group detects the deformation of the first wall and generates a detection signal indicating the direction and the magnitude of the deformation. The controller generates a command to pause playing of the music based on the direction and magnitude of the deformation. Or, the user may press the first wall harder than in the case above, and in this case, the controller may turn the earphone to sleep mode.

As is well appreciated, deformation case directly depends on how the user presses the housing, that is, depending on a user input, the controller may identify a user input based on the deformation case and trigger an event in response to the user input.

It is understandable that the events to be triggered by different user inputs may be configured as needed.

Figure 2:
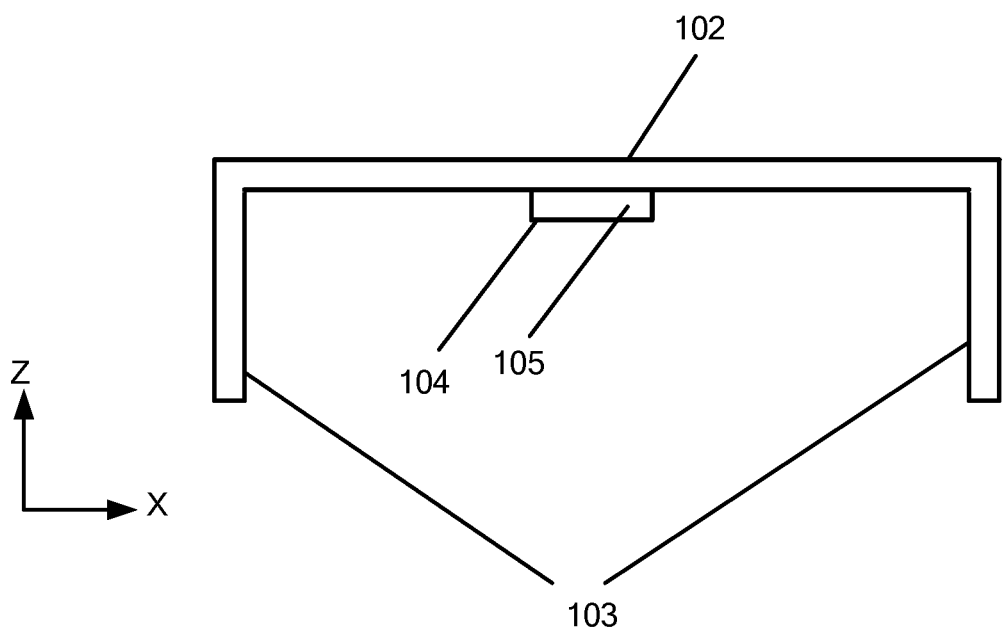
FIG. 2 illustrates a location of a strain sensor group in housing according to an embodiment of the present disclosure.

FIG. 2 illustrates a location of the strain sensor group 104 in the housing according to an embodiment of the present disclosure. In FIG. 2, the first wall 102 and the second wall 103 form a common part, i.e., the first wall 102 and the second wall 103 are integrated into the wall. The strain sensor group 104 is attached on the inside of the first wall 102 of the housing and is configured to detect deformation of the first wall 102 only in x direction because the strain sensor group 104 has a strain sensor 105 that is more sensitive at x direction than z direction.

The user may put his fingers on left side and right side of the second wall 103 and pushes from left to right. In this case, the first wall 102 is deformed, more precisely, squeezed, in x direction, which is referred to as deformation case 2a as shown in FIG. 4, and the strain sensor generates a negative detection signal. The negative detection signal may be a voltage signal referred to as a first detection signal.

Or, the user may put his finger on the first wall, and pushes downward from top. In this case, the first wall, is deformed, more precisely, stretched or expanded, which is referred as deformation case 2b as shown in FIG. 4, and the strain sensor may generate a positive detection signal. In the embodiment, the detection signal may be a voltage signal referred to as a second detection signal.

Figure 3:
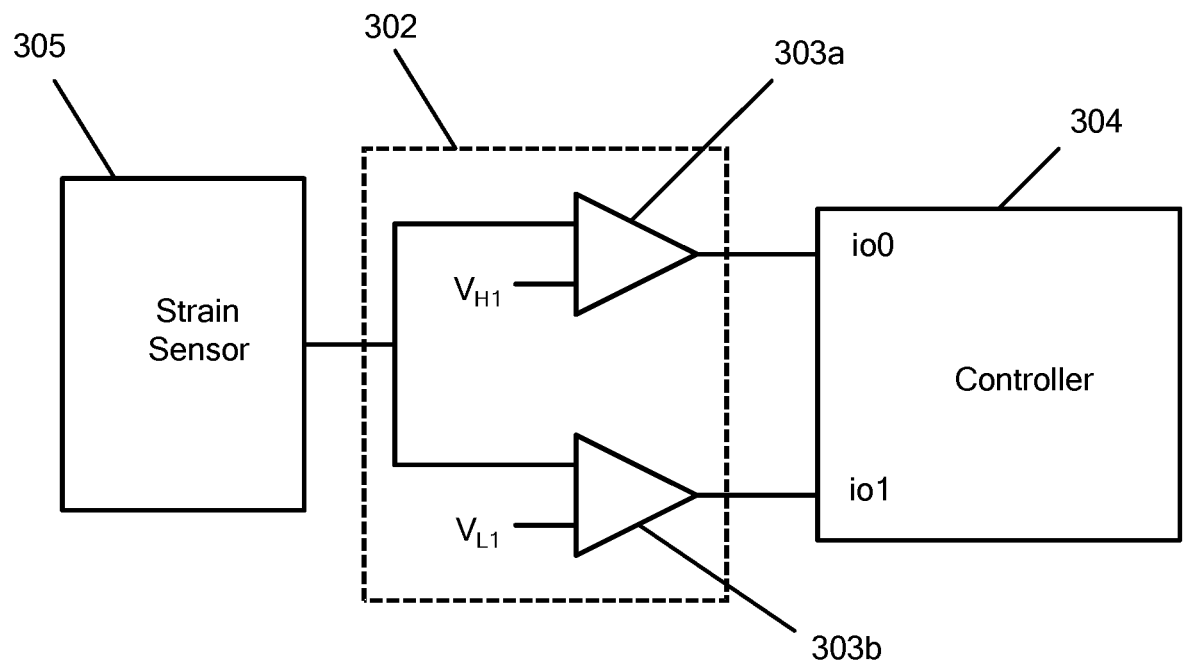
FIG. 3 is a partial schematic circuit block diagram of the electronic device as shown in FIG. 2.

As shown in FIG. 3, the electronic device includes a strain sensor 305, an analog-to-digital converter (ADC) 302 and a controller 304. The ADC 302 includes an input terminal connected to the strain sensor 305 and an output terminal connected to the controller 304. In an embodiment, the ADC 302 may be implemented as a comparator group 302. The comparator group 302 includes a first comparator 303a and a second comparator 303b respectively having reference voltages $V_{H1}$ and $V_{L1}$, where the reference voltage $V_{H1}$ is higher than $V_{L1}$. The first or second detection signal generated by the strain sensor 305 may be transmitted respectively to the first and second comparators 303a and 303b. The first comparator 303a outputs a high level signal in a case that the detection signal for the comparator 303a has a voltage higher than $V_{H1}$, and outputs a low level signal in a case that voltage of the detection signal for the comparator 303a is lower than $V_{H1}$. The second comparator 303b outputs a high level signal in a case that the detection signal for the second comparator 303b has a voltage higher than $V_{L1}$, and outputs a low level signal in a case that voltage of the detection signal for the comparator 303b is lower than $V_{L1}$. The two comparators 303a and 303b may be respectively connected to two input terminals io0 and io1 of the controller.

In other embodiments, the ADC 302 may be a SAR (Successive Approximation Converter), a delta-sigma converter or a pipeline ADC. In this embodiment, the description is made with reference to combination of comparators, while it is understandable that in other embodiments, usual ADC architectures such as listed above may also be configured in the electronic device.

Reference may be made again to FIG. 4. In an initial state where no external force is applied on the first wall, a detection signal to the comparator group 302 has a voltage between $V_{H1}$ and $V_{L1}$. The first comparator 303a outputs a low level signal to the input terminal io0 of the controller 304, and the second comparator 303b outputs a high level signal to the input terminal io1 of the controller 304. No deformation is determined by the controller 304.

When the user pushes inward from left to right of the side wall, that is, in deformation case 2a, the strain sensor 305 detects deformation of the first wall in x direction and generates a first detection signal indicating that the first wall is squeezed in x direction. The first detection signal has a negative voltage. The first detection signal is provided to the first comparator 303a, and the first comparator 303a outputs a low level signal to the input terminal io0 of the controller 304 as a voltage of the first detection signal is lower than $V_{H1}$. The first detection signal is also provided to the second comparator 303b, and the second comparator 303b outputs a low level signal to the input terminal io1 of the controller 304 as the voltage of the first detection signal is lower than the reference voltage $V_{L1}$.

When the user puts his finger on the first wall and pushes downward from top, that is, in deformation case 2b, the first wall of the housing is stretched or expanded. The strain sensor 305 detects this deformation of the first wall and generates a second detection signal indicating the stretching or expanding of the first wall. The second detection signal has a positive voltage. The second detection signal is provided to both the first and the second comparators 303a and 303b. The first and second comparators 303a and 303b respectively output high level signals to the input terminals io0 and io1 of the controller 304, as a voltage of the second detection signal is higher than $V_{H1}$ and $V_{L1}$.

Based on the inputs to the input terminals io0 and io1, the controller 304 can determine the deformation case based on the correspondence relationship in FIG. 4. For example, the controller 304 may determine the deformation case 2a in a case that inputs to the input terminals io0 and io1 are both low level signals, determine deformation case 2b in a case that inputs to the input terminals io0 and io1 are both high level signals, and determine no deformation case in a case that input to the input terminal io0 is a low level signal and input to the input terminal io1 is a high level signal, as shown in FIG. 4. The correspondence relationship involves one-to-one correspondence among the user input (indicated by first or second detection signal to ADC 302), inputs to the controller 304 and deformation cases. Three deformation cases are described in FIG. 4, i.e., no deformation, deformation case 2a and deformation case 2b. The correspondence relationship is pre-configured in the electronic device or defined by the user in use.

The controller may generate a command to trigger a first event corresponding to the determined deformation case. For example, the controller may generate a command to pause playing of music in a case of deformation case 2a, and generate a command to play a next song in a case of deformation case 2b.

Figure 5:
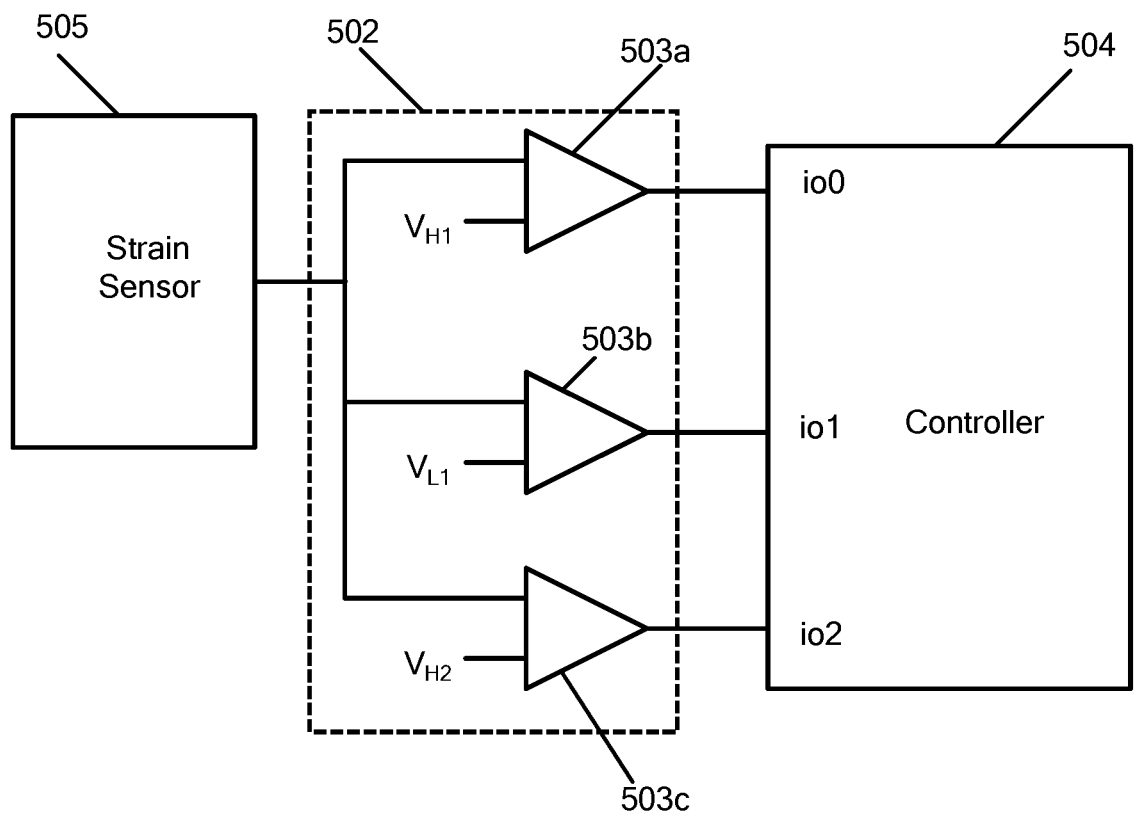
FIG. 5 shows a partial schematic circuit block diagram of the electronic device according to an embodiment of the present disclosure.

FIG. 5 shows a partial schematic circuit block diagram of the electronic device according to another embodiment of the present disclosure. The electronic device includes a strain sensor 505, an analog-to-digital converter (ADC) 502 and a controller 504. The ADC 502 includes an input terminal connected to the strain sensor 505 and an output terminal connected to the controller 504. The ADC 502 may be implemented as a comparator group. The comparator group includes a first comparator 502a, a second comparator 502b and a third comparator 502c respectively having reference voltages $V_{H1}$, $V_{L1}$ and $V_{H2}$. In this embodiment, the reference voltage $V_{H2}$ is higher than $V_{H1}$, and $V_{H1}$ is higher than $V_{L1}$. The first, second or third detection signal generated by the strain sensor 505 are transmitted respectively to the first, second and third comparators 503a, 503b and 503c. The first comparator 503a outputs a high level signal in a case that the detection signal for the comparator 503a has a voltage higher than $V_{H1}$, and outputs a low level signal in a case that voltage of the detection signal for the comparator 503a is lower than $V_{H1}$. The second comparator 503b outputs a high level signal in a case that the detection signal for the second comparator 503b has a voltage higher than $V_{L1}$, and outputs a low level signal in a case that voltage of the detection signal for the comparator 503b is lower than $V_{L1}$. The two comparators 503a and 503b may be respectively connected to two input terminals io0 and io1 of the controller.

In other embodiments, the ADC 502 may be a SAR (Successive Approximation Converter), a delta-sigma converter or a pipeline ADC. In this embodiment, the description is made with reference to combination of comparators, while it is understandable that in other embodiments, usual ADC architectures such as listed above may also be configured in the electronic device.

FIG. 6 shows a correspondence relationship between deformation cases and input to comparator group shown in FIG. 5. In an initial state where no external force is applied on the first wall, a detection signal to the comparator group 502 has a voltage between $V_{H1}$ and $V_{L1}$. The first comparator 503a outputs a low level signal to the input terminal io0 of the controller 504, the second comparator 503b outputs a high level signal to the input terminal io1 of the controller 504, and the third comparator 503c outputs a low level signal to the input terminal io2 of the controller 504. No deformation is determined by the controller 504.

When the user for example pushes inward from left to right of the side wall, that is, in deformation case 3a, the strain sensor 505 detects deformation of the first wall in x direction and generates a first detection signal indicating that the first wall is squeezed in x direction. The first detection signal has a negative voltage. The first detection signal is provided to the first comparator 503a, and the first comparator 503a outputs a low level signal to the input terminal io0 of the controller 504 as a voltage of the first detection signal is lower than $V_{H1}$. The first detection signal is also provided to the second comparator 503b, and the second comparator 503b outputs a low level signal to the input terminal io1 of the controller 504 as the voltage of the first detection signal is lower than the reference voltage $V_{L1}$. The first detection signal is also provided to the third comparator 503c, and the third comparator 503c outputs a low level signal to the input terminal io2 of the controller 504 as the voltage of the first detection signal is lower than the reference voltage $V_{L1}$.

When the user for example puts his finger on the first wall and pushes downward from top, that is, in deformation case 3b, the first wall of the housing is stretched or expanded. The strain sensor 505 detects this deformation of the first wall and generates a second detection signal indicating the stretching or expanding of the first wall. The second detection signal has a positive voltage. The second detection signal is provided to the first, second and third comparators 503a, 503b and 503c. The first, second and third comparators 503a, 503b and 503c respectively output high, high and low level signals to the input terminals io0, io1 and io2 of the controller 504.

When the user for example push harder downward than in deformation case 3b by applying a stronger force on the first wall, that is, in deformation case 3c, accordingly, the strain sensor 505 generates a third detection signal. The third detection signal has a positive voltage having a magnitude larger than that of the second detection signal. The first, second and third comparators 503a, 503b and 503c respectively output high level signals to the input terminals io0, io1 and io2 of the controller 504. This is defined as deformation case 3c in FIG. 6.

Based on the voltage states to the input terminals io0, io1 and io2, the controller 504 can determine the deformation case based on the correspondence relationship in FIG. 6. For example, the controller 504 may determine the deformation case 3c in a case that the voltage state to the input terminals io0, io1 and io2 are all high level signals. The correspondence relationship involves one-to-one correspondence among the user input (indicated by first or second detection signal to ADC 502), inputs to the controller 504 and deformation cases. The correspondence relationship is pre-configured in the electronic device or defined by the user in use.

The controller may generate a command to trigger a first event corresponding to the determined deformation case. For example, the controller may generate a command to pause playing of music in a case of deformation case 3a, generate a command to play a next song in a case of deformation case 3b, and generate a command to play fast forward in a case of deformation case 3c.

In another embodiment, the third comparator 503c has a reference voltage $V_{L2}$ lower than $V_{L1}$. In this case, when the user pushes inward from left to right of the side wall but with a stronger force than in deformation case 3a, which may be referred to as deformation case 3d, the strain sensor 505 generates a fourth detection signal indicating the direction and magnitude of the deformation, and the voltage of the fourth detection signal may be lower than $V_{L2}$. In this way, in a case that the input state of the input terminal io2 changes from high level to low level, the controller may determine that deformation case 3d has occurred.

Figure 7:
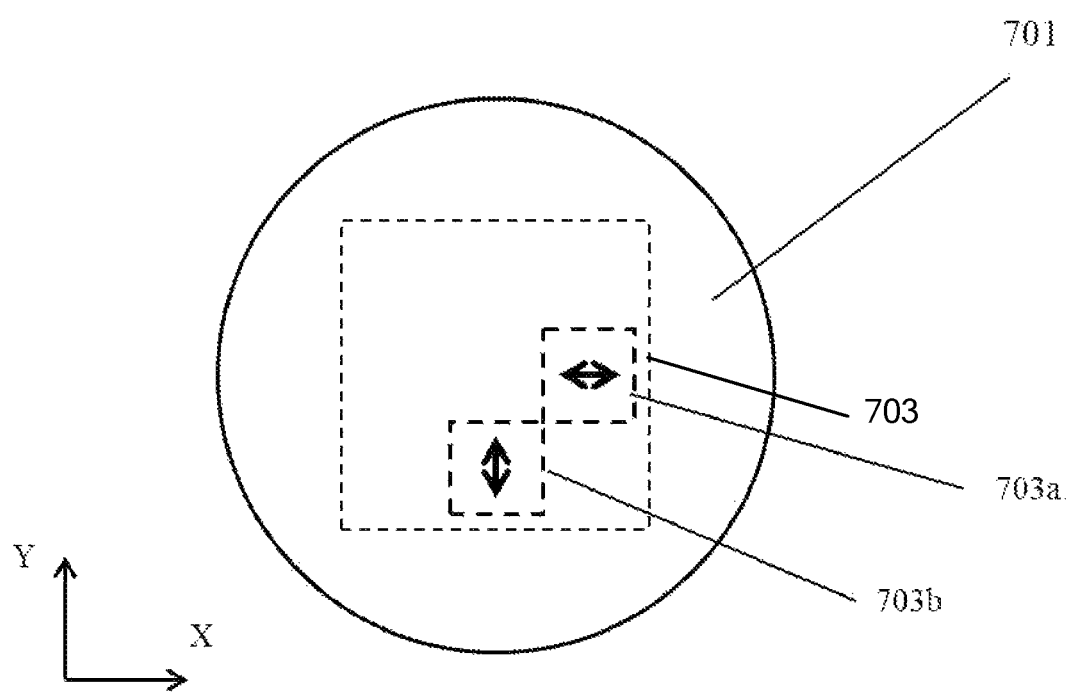
FIG. 7 illustrates an arrangement of two strain sensors in a strain sensor group according to an embodiment of the present disclosure.

The strain sensor group according to the foregoing embodiments is configured with one strain sensor. In some embodiments, the strain sensor group may include more than one strain sensor. In an embodiment as illustrated in FIG. 7, the strain sensor group 703 may include a first strain sensor 703a and a second strain sensor 703b. The two strain sensors are attached on the inside of the first wall 701. In an embodiment, the detection directions of the two strain sensors may be perpendicular to each other, that is, an angle between the two detection directions is 90 degrees, as is shown in FIG. 7. For example, the first and second strain sensors 703a and 703b are configured to detect deformation in x and y directions respectively.

In another embodiment, N strain sensors are configured, where N is equal to or greater than 2 and the N strain sensors detect the deformation of the first wall in N directions. An angle between each two adjacent directions of the N directions is 180/N degrees. For example, three strain sensors are configured, and the angle between each two adjacent directions is 60 degrees.

Figure 8:
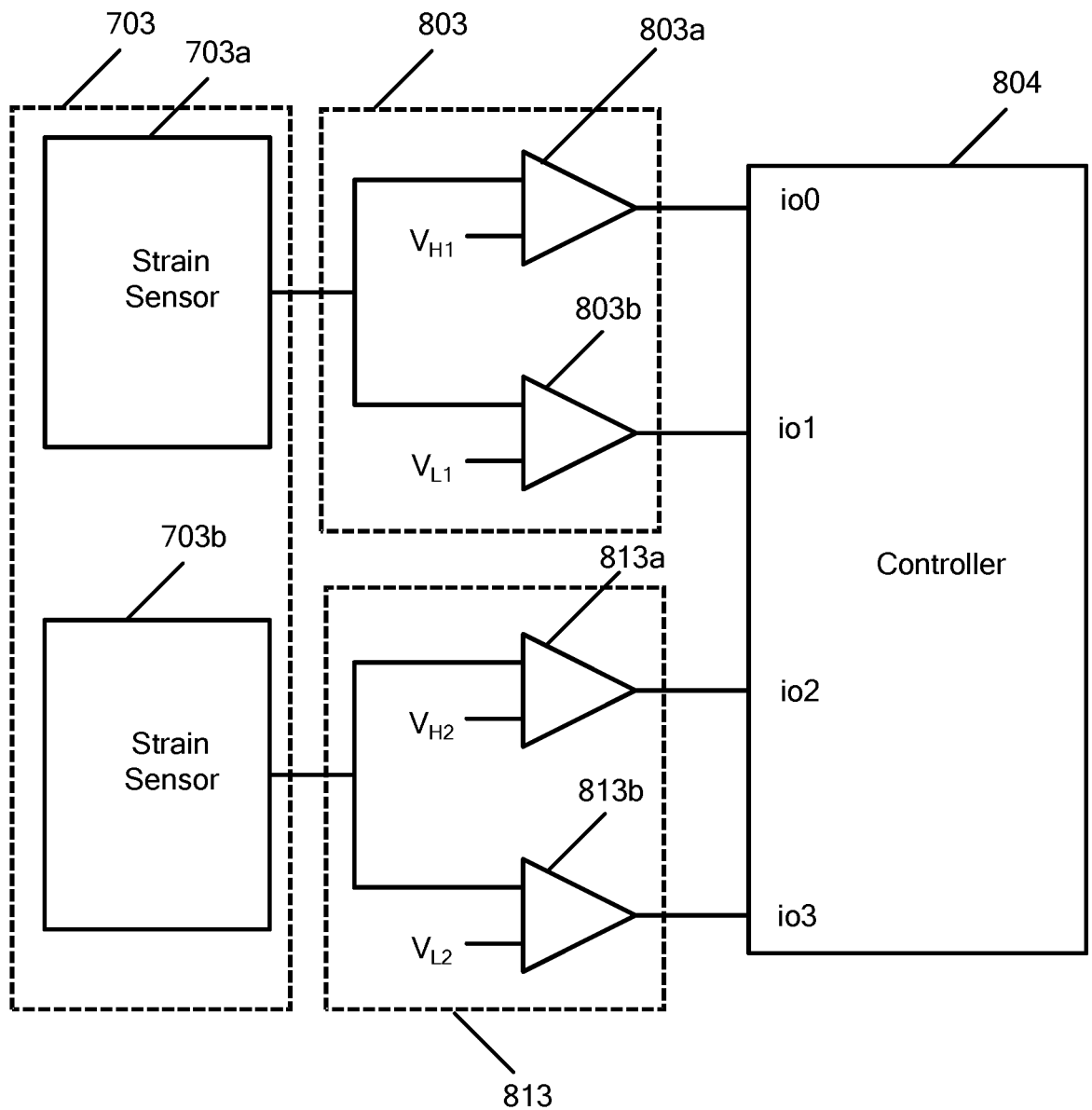
FIG. 8 is a partial schematic circuit block diagram of an electronic device including two strain sensors as illustrated in FIG. 7.

FIG. 8 is a partial schematic circuit block diagram of an electronic device including two strain sensors as illustrated in FIG. 7 according to an embodiment of the present disclosure. As is shown in FIG. 8, the strain sensor group 703 includes a first strain sensor 703a and a second strain sensor 703b. A first comparator group 803 includes a first comparator 803a and a second comparator 803b. A second comparator group 813 includes a third comparator 813a and a fourth comparator 813b. The first comparator group 803 has an input connected to an output of the first strain sensor 703a, and two outputs connected to io0 and io1 of a controller 804. The second comparator group 813 has an input connected to an output of the second strain sensor 703b, and two outputs connected to io2 and io3 of the controller 804. The reference voltages of the first to fourth comparators are $V_{H1}$, $V_{L1}$, $V_{H2}$ and $V_{L2}$, respectively, where $V_{H1}$ is higher than $V_{L1}$ and $V_{H2}$ is higher than $V_{L2}$.

The user may for example put his fingers on left side and right side of the second wall and pushes from left to right, which may be referred to as deformation case 4a as shown in FIG. 9. The user may put his fingers on upper side and bottom side of the second wall and pushes from top to bottom, which may be referred to as deformation case 4b in the embodiment. The user may put his finger on the first wall and pushes downward from top, which is referred to as deformation case 4c. The first wall is squeezed in x direction in deformation case 4a, squeezed in y direction in deformation case 4b and stretched or expanded in both x and y directions in deformation case 4c. First and second detection signals indicating the direction and magnitude of the deformation are generated by the strain sensor group 703 in deformation cases 4a and 4b, respectively. In deformation case 4c, as the first wall is stretched or expanded in both x and y directions, third and fourth detection signals are generated by both the first strain sensor 703a and the second strain sensor 703b. In an initial state that the user does not operate the electronic device, i.e., no external force is applied on the first wall, no deformation is detected because detection signals to the comparator groups 803 and 813 have a voltage between VH1 and VL1 as well as a voltage between VH2 and VL2 respectively.

In deformation case 4a, the first wall is squeezed in x direction and a voltage of the first detection signal is lower than the reference voltage $V_{L1}$ of the second comparator 803b. Thus, the second comparator 803b outputs a low level signal to the input terminal io1 of the controller instead of the high level signal in the initial state, and input states of the other input terminals of the controller remains the same as in the initial state.

In deformation case 4b, the first wall is squeezed in y direction and a voltage of the second detection signal is lower than the reference voltage $V_{L2}$ of the fourth comparator 813b. Thus, the fourth comparator 813b outputs a low level signal to the input terminal io3 of the controller instead of the high level signal in the initial state, and input states of the other input terminals of the controller remains the same as in the initial state.

In deformation case 4c, the first wall is stretched or expanded in both x and y directions, a voltage of the third detection signal is higher than the reference voltage $V_{H1}$ of the first comparator 803a and a voltage of the fourth detection signal are higher than the reference voltage $V_{H2}$ of the third comparator 813a. Thus, the first comparator 803a and the third comparator 813a outputs high level signals to input terminals io0 and io2 of the controller, respectively. In this case, the second comparator 803b and the fourth comparator 813b still output high level signals to the input terminals io1 and io3, respectively, as in the initial state.

The reference voltages VH1, VL1, VH2 and VL2 may be properly set, so that the above logic as shown in FIG. 9 can be implemented. In some embodiments, the reference voltages VH1, VL1, VH2 and VL2 may be set according to sensor sensitivity, stability of output level and noise level. In some embodiments, VL1 and VL2 may be equal to or different from each other. In some embodiments, VH1 and VH2 may be equal to or different from each other.

As can be seen from the above embodiments, the number of input patterns will increase with the increasing number of strain sensors, in order to process the large number of input patterns from deformation detection, a dedicated processor, for example, a microprocessor, may be provided in the electronic device.

Figure 10:
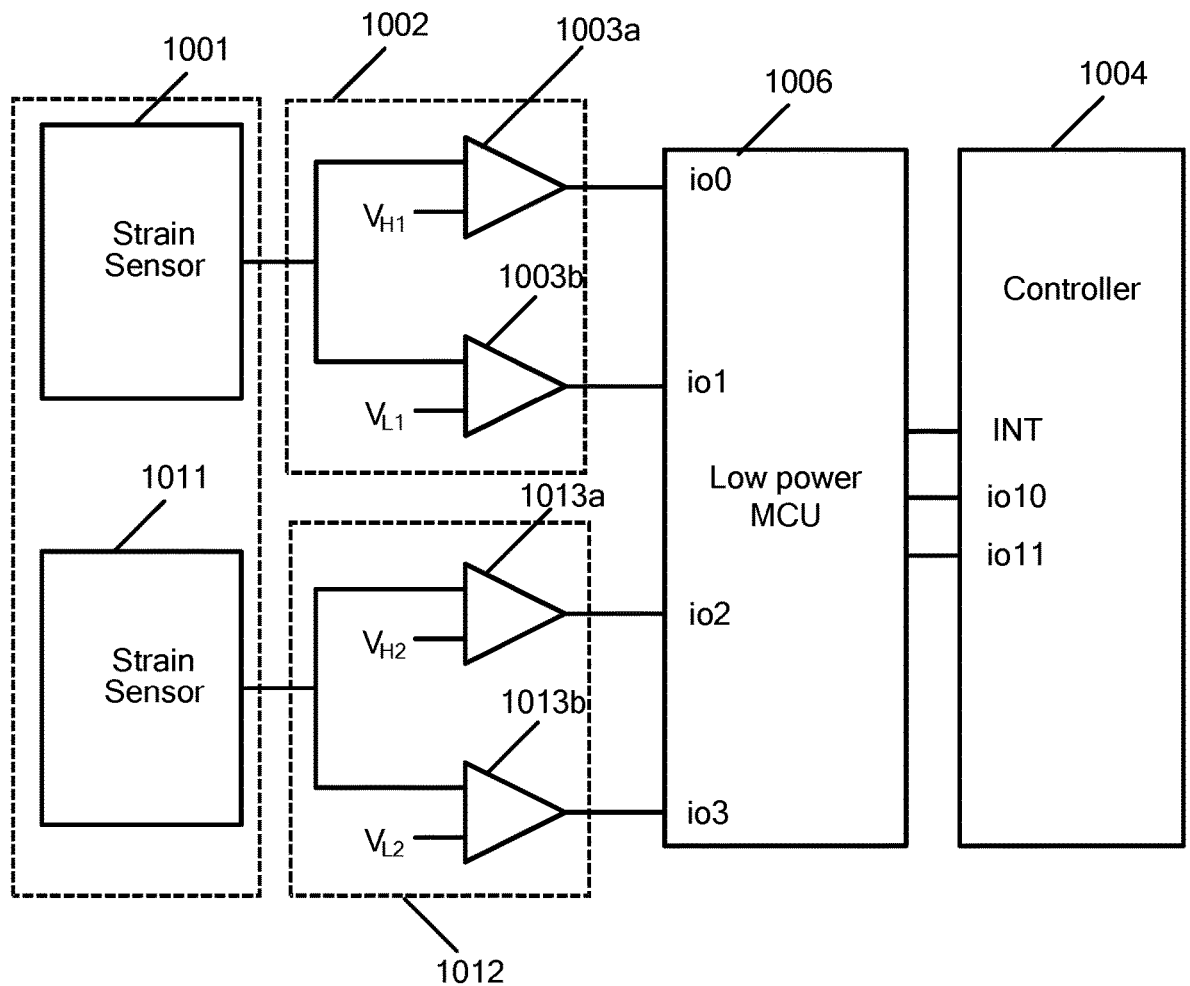
FIG. 10 is a partial schematic circuit block diagram of an electronic device including two strain sensors according to an embodiment of the present disclosure.

In an embodiment, as shown in FIG. 10, the electronic device may further include a low power microcontroller (MCU) 1006. The MCU 1006 may have four input terminals io0, io1, io2 and io3 and is connected between the controller 1004 and the comparator groups 1002 and 1012 respectively connected to strain sensors 1001 and 1011. The first to fourth comparators 1003a, 1003b, 1013a and 1013b are respectively connected to the four input terminals io0, io1, io2 and io3 of the MCU 1006, and the controller 1004 has three input terminals INT, io10 and io11 via which the controller is connected to the MCU 1006. The input terminals of the controller io10 and io11 may be serial interfaces for digital inputs. The MCU 1006 is configured to process digital signals from the comparator groups 1002 and 1012 and transmit the processed digital signals to the controller 1004, and the controller 1004 determines a deformation case based on the processed digital signals and triggers a first event in the electronic device corresponding to the deformation case as determined.

By providing a low power MCU, the power consumption of the electronic device is limited with the processing capability thereof guaranteed.

In an embodiment, the low power MCU may be replaced by a logic circuit, which is not elaborated herein for purpose of conciseness.

Figure 11:
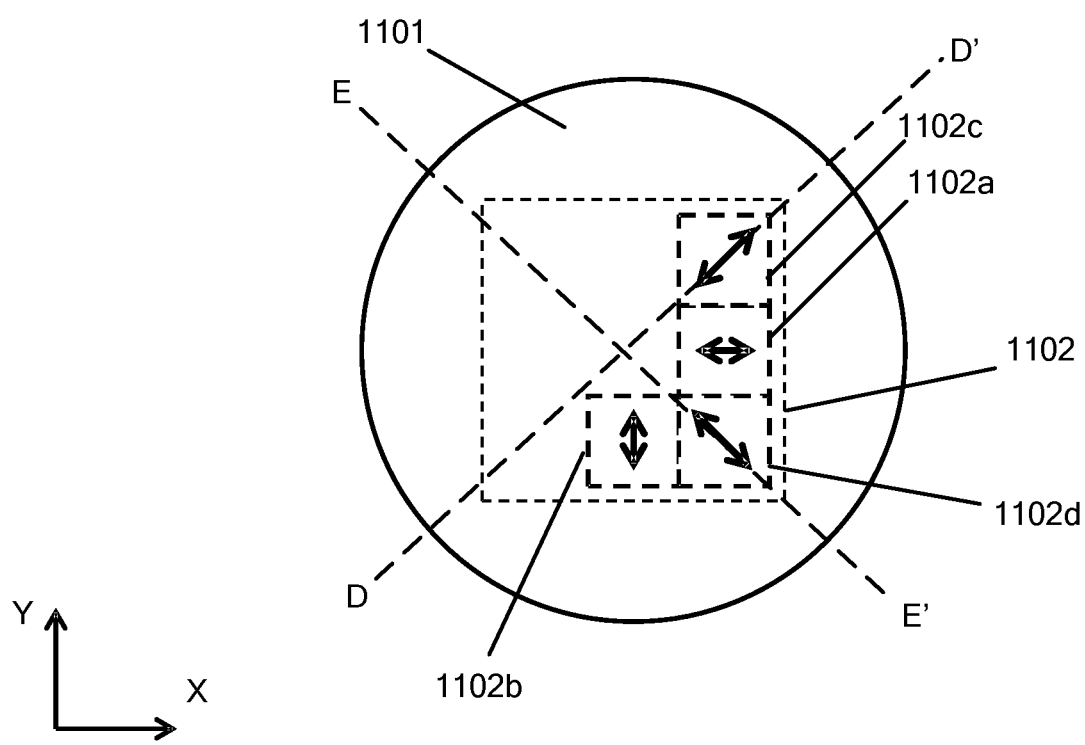
FIG. 11 illustrates an arrangement of four strain sensors in a strain sensor group according to an embodiment of the present disclosure.

The strain sensor group may also include more than two strain sensors. In an embodiment as shown in FIG. 11, the strain sensor group includes four strain sensors 1102a, 1102b, 1102c and 1102d. The deformation-sensitive directions of the four strain sensors are different from each other. As shown in FIG. 11, the deformation-sensitive directions are evenly spaced circumferentially and an angle between each two adjacent deformation-sensitive directions is 45 degrees. In an embodiment of the present disclosure, the number of strain sensors in one stain sensor group is N, and an angle between each two adjacent ones of detection directions of the N strain sensors is 180/N degrees, where N is an integer equal to or greater than 2.

The user may put his fingers on the second wall, for example, the side wall, of the electronic device and push inward along the four directions, namely, x direction, y direction, D-D' direction and E-E' direction. Correspondingly, there are five deformation cases 5a, 5b, 5c, 5d and 5e, as shown in FIG. 13. Deformation cases 5a, 5b, 5c and 5d correspond to user inputs in x direction, y direction, D-D' direction and E-E' direction, respectively. The user may also put his finger on the first wall and push downward from the top, and the first wall will deform in a corresponding manner, which may be referred as deformation case 5e.

Figure 12:
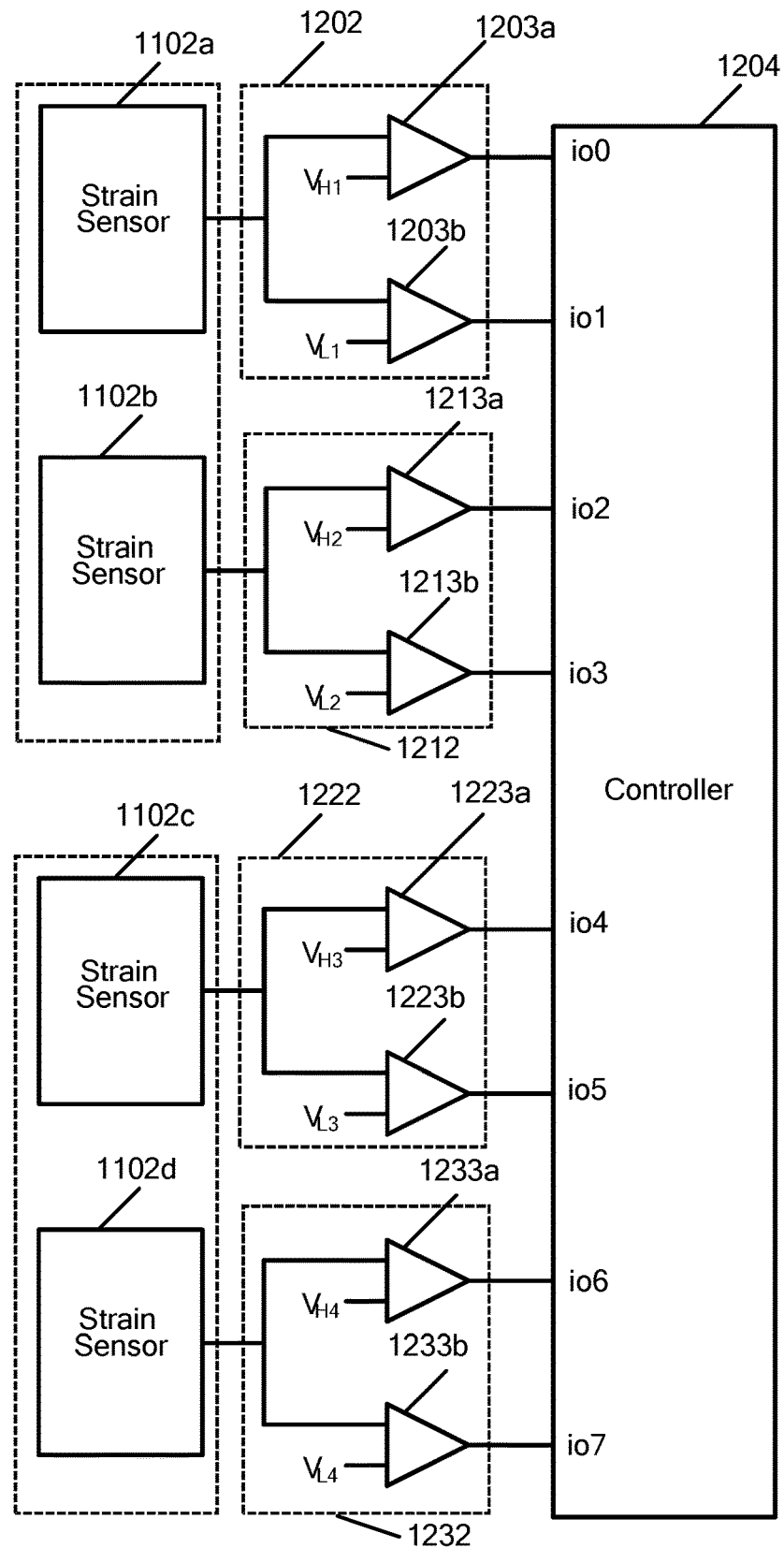
FIG. 12 is a partial schematic circuit block diagram of an electronic device including four strain sensors as illustrated in FIG. 11 according to an embodiment of the present disclosure.

Like the foregoing embodiments, the four strain sensors each may be connected to a comparator group including four comparators having different reference voltages, and the controller may identify the deformation case based on the respective detection signals. As shown in FIG. 12, a first comparator group 1202 has a first comparator 1203a and a second comparator 1203b, a second comparator group 1212 has a third comparator 1213a and a fourth comparator 1213b, a third comparator group 1222 has a fifth comparator 1223a and a sixth comparator 1223b and a fourth comparator group 1232 has a seventh comparator 1233a and an eighth comparator 1233b. The first comparator group 1202 has an input connected to an output of the stain sensor 1102a, and two outputs connected to io0 and io1 of a controller 1204. The second comparator group 1212 has an input connected to an output of the stain sensor 1102b, and two outputs connected to io2 and io3 of the controller 1204. The third comparator group 1222 has an input connected to an output of the stain sensor 1102c, and two outputs connected to io4 and io5 of the controller 1204. The fourth comparator group 1232 has an input connected to an output of the stain sensor 1102d, and two outputs connected to io6 and io7 of the controller 1204. The reference voltages of the first to eighth comparators are $V_{H1}$, $V_{L1}$, $V_{H2}$, $V_{L2}$, $V_{H3}$, $V_{L3}$, $V_{H4}$, $V_{L4}$, respectively, where $V_{H1}$ is higher than $V_{L1}$, $V_{H2}$ is higher than $V_{L2}$, $V_{H3}$ is higher than $V_{L3}$, and $V_{H4}$ is higher than $V_{L4}$.

Reference is made to FIG. 13, which shows a correspondence relationship between deformation cases and input to comparator group shown in FIG. 12. In an initial state that the user does not operate the electronic device, i.e., no external force is applied on the first wall, no deformation is detected because detection signals to the comparator groups 1202 to 1232 have a voltage between $V_{H1}$ and $V_{L1}$, a voltage between $V_{H2}$ and $V_{L2}$, a voltage between $V_{H3}$ and $V_{L3}$, and a voltage between $V_{H4}$ and $V_{L4}$, respectively. Each comparator group outputs a low level signal and a high level signal.

When the user pushes the side wall inward along one of the four directions as identified above, one of the four sensors 1102a to 1102d which has a deformation-sensitive direction coinciding with the pushing direction of the user generates a negative signal and outputs the negative signal to a corresponding comparator group. A voltage of the negative signal is lower than reference voltages of both comparators in the comparator group. In this case, both the comparators output a low level signal to the controller 1204. The controller 1204 determines that a corresponding deformation case has occurred and may generate a command to trigger a first event corresponding to the determined deformation case.

For example, as shown in FIG. 13, when the user pushes the side wall inward along x direction, the strain sensor 1102a accordingly generates a detection signal indicating the squeezing of the first wall and outputs the detection signal to comparator group 1202. A voltage of the detection signal is lower than the reference voltages $V_{H1}$ and $V_{L1}$ of comparators 1203a and 1203b, and therefore, both comparators 1203a and 1203b output a low level signal to io0 and io1 of the controller 1204. By checking the input states of io0 and io1, the controller determines that deformation case 5a has occurred and may further generate a command to trigger an event corresponding to deformation case 5a. When the user pushes the side wall inward along other directions, the controller can determine a corresponding deformation case in a similar manner, which is thus not described herein.

When the user puts his finger on the first wall and pushes downward from top, the first wall is stretched or expanded, and the stretching or expanding can be detected by all the strain sensors 1102a to 1102d based on which each of strain sensors 1102a to 1102d generates a detection signal. The detection signal corresponding to each strain sensor has a voltage that is higher than reference voltages of comparators in a comparator group connected to a respective strain sensor. In this case, all the eight comparators 1203a to 1233b output a high level signal to io0 to io7 of the controller 1204, respectively, and the controller 1204 determines that deformation case 5e has occurred on detecting that inputs to io0 to io7 are all high level signals.

Reference may be made to the foregoing embodiments for implementation of the identification as the underlying idea is the same and the difference from the foregoing embodiments merely lies in the number of strain sensors in the strain sensor group.

In the foregoing embodiments, the electronic device is configured with one strain sensor group. In some embodiments, the electronic device may include more than one strain sensor group. In an embodiment, as shown in FIG. 14, the electronic device includes a first strain sensor group 1410 and a second strain sensor group 1411 attached on the first wall 1401. The first or the second strain sensor group may include one or more strain sensors. In the embodiment, the first strain sensor group 1410 includes a first strain sensor 1404a and a second strain sensor 1404b, and the second strain sensor group 1411 includes a third strain sensor 1405a and a fourth strain sensor 1405b.

The user may put his fingers on side wall portions 1406 and 1407 and pushes inward from top to bottom, and the first wall is squeezed in y direction in the first strain sensor group portion, which is referred to as deformation case 6a in the embodiment.

Or, the user may put his fingers on side wall portions 1408 and 1409 and pushes inward from top to bottom, and the first wall is squeezed in y direction in the second strain sensor group portion, which is referred to as deformation case 6b in the embodiment.

Or, the user may put his fingers on side wall portions 1412 and 1413 and pushes inward from left to right, and the first wall is squeezed in x direction, which is referred to as deformation case 6c in the embodiment.

Or, the user may put his finger on the first strain sensor group 1410 and pushes downward from the top, and the first wall is stretched or expanded in both x and y directions, which may be referred to as deformation case 6d in the embodiment.

Or, the user may put his finger on the second strain sensor group 1411 and pushes downward from the top, and the first wall is stretched or expanded in both x and y directions, which may be referred to as deformation case 6e in the embodiment.

Different detection signals may be generated corresponding to the deformation cases 6a to 6e, the detection signals indicating respective directions and magnitudes of the deformation. The controller may identify a deformation case based on the detection signals by checking the input states thereof as is described in the above embodiments. Also, reference may be made to the foregoing embodiments for implementation of and configurations for the identification process.

In addition to direction and magnitude of the deformation, the detection signal may, in some cases, indicate a position of the deformation, that is, where the deformation occurs on the first wall. For example, when the user pushes downward from the top at the region where the first strain sensor group is located, a detection signal may be generated, and the controller determines from the detection signal as generated that the deformation occurs at the region where the first strain sensor group is located.

In some embodiments, the user may put two fingers on the first and second strain sensor groups 1410 and 1411 and push downward from the top at the same time, and the first wall is deformed both at the first and the second strain sensor groups, which may be defined as a deformation case 6f. The controller may accordingly generate a command to trigger an event corresponding to the deformation case 6f. For example, when the user puts two fingers on the first and second strain sensor groups and pushes downward from the top at the same time, the controller may generate a command to trigger an event preset by the user.

In FIG. 14, the electronic device has two strain sensor groups, and each strain sensor group is configured with two strain sensors. In other embodiments, the electronic device may have more than two strain sensor groups, and each strain sensor group may include more than two strain sensors. The number of the strain sensor groups and the number of strain sensors in each strain sensor group may be determined as needed in practice.

Figure 15:
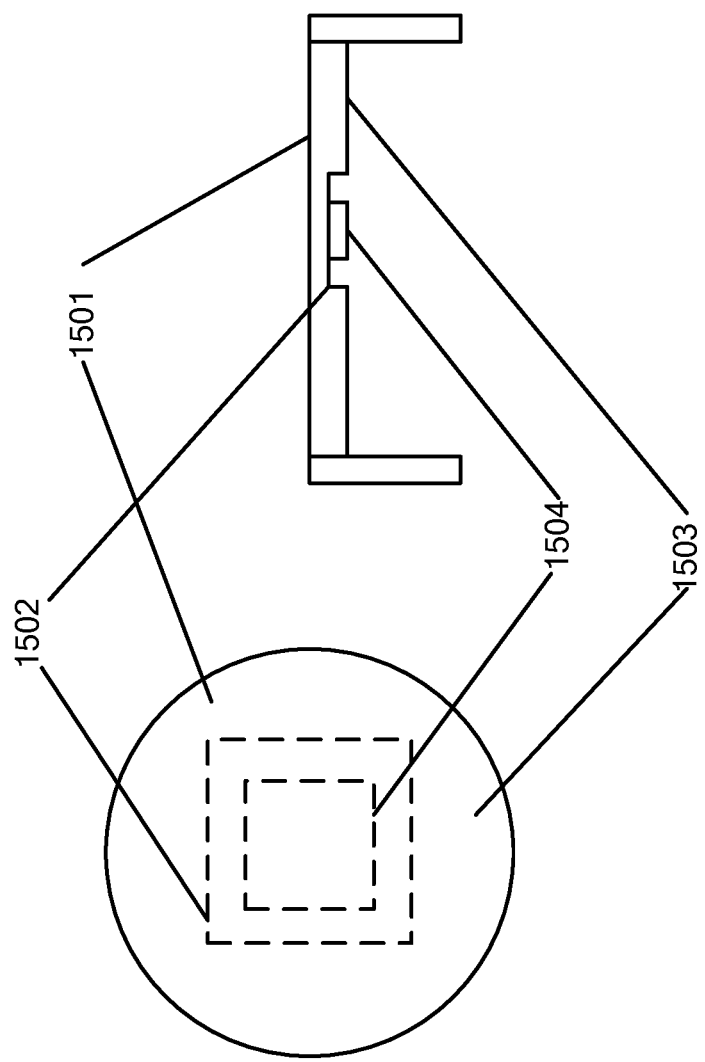
FIG. 15 is a schematic top view and a corresponding sectional view of an electronic device according to an embodiment of the present disclosure.

In some embodiments, the first wall may have a concave portion that is thinner than the other portion of the first wall. FIG. 15 shows a top view and a cross sectional view of an electronic device according to an embodiment of the present disclosure. As shown in FIG. 15, the first wall 1501 has a first portion 1502 and a second portion 1503. The first portion has a first thickness, the second portion has a second thickness and the first thickness is smaller than the second thickness. The strain sensor group 1504 is attached on the inside of the first portion with the first thickness, for example, within the recess formed by the thickness difference between the first and second portions in FIG. 15. The rigidity of the first portion may be smaller than that of the second portion. The size of the first portion may be adjusted so as to accommodate as many strain sensor groups as needed. That is, more than one strain sensor group may be arranged on the first portion in some embodiments.

In order to accommodate the strain sensor group, the first portion may be designed to have suitable shapes. In an embodiment, the shape of the first portion may be a cross shape with crossing at the center of the first wall of the housing. The strain sensor or strain sensors in the strain sensor group may be distributed in the cross-shaped first portion. For example, the strain sensor group may have five strain sensors, one of which is located at the center of the cross-shaped first portion and the other of which may be respectively located at four arms of the cross-shaped first portion. The shape of the first portion may be designed based on the number of strain sensors in the strain sensor group, shapes of the strain sensors or other assembly considerations, which is not limited in the present disclosure, so long as the first portion may accommodate the strain sensor group.

By this arrangement, deformation of the first wall can be focused on the first portion, and sensitivity of the strain sensor group is enhanced. In addition, the first portion may work as guide to place the strain sensor group correctly in manufacturing, thereby improving accuracy of alignment of the strain sensor group for better quality control.

Figure 16:
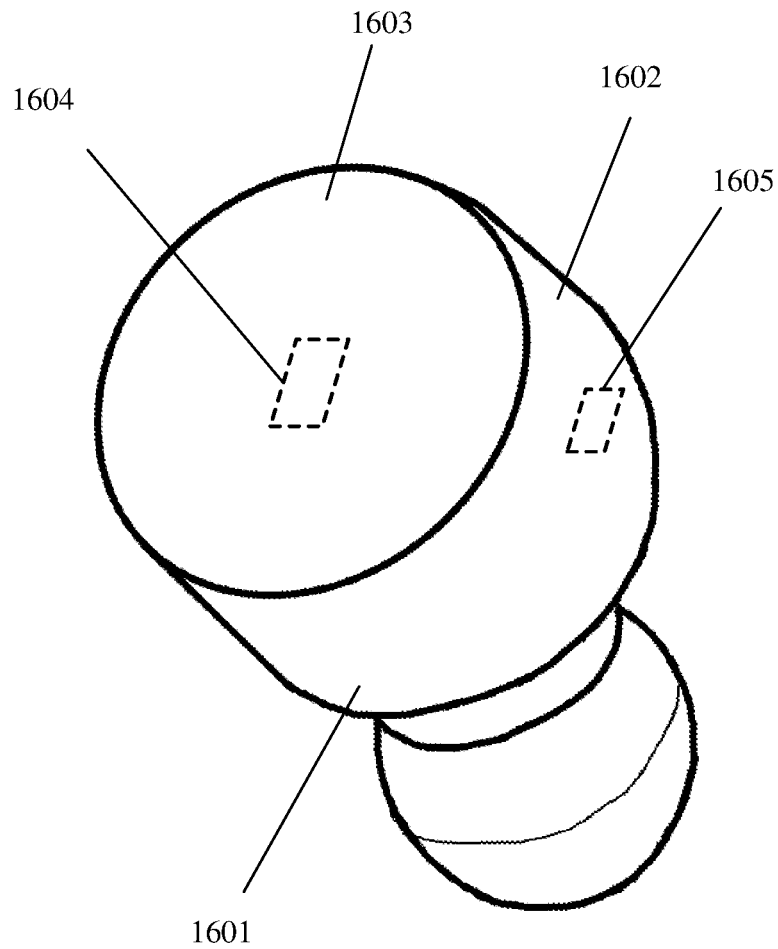
FIG. 16 is a schematic view of an electronic device according to an embodiment of the present disclosure.

Unlike capacitive touch, deformation of the housing may be caused not only by human body but also by many other means some of which is unintentional to a user, for example, the electronic device may be dropped by the user accidently and deformed by contact with foreign objects while the user does not intend to operate the device. In this case, false detection may occur. In an embodiment, in addition to the strain sensor group, the electronic device may further include a deformation detection enabling sensor. As shown in FIG. 16, the electronic device includes a housing 1601, the housing 1601 has a first wall 1603 and a second wall 1602, and a strain sensor group 1604 is attached on the inside of the first wall. The electronic device may further include a deformation detection enabling sensor 1605 which is connected to a controller. The deformation detection enabling sensor 1605 is configured to detect whether the electronic device, for example, an earphone, is worn by a user. Deformation detection function of the electronic device is enabled only in a case that the deformation detection enabling sensor detects that the earphone is worn by a user. The deformation detection enabling sensor may be a human body sensor, such as a temperature sensor, an infrared sensor or a capacitive sensor.

In an embodiment, the deformation detection enabling sensor 1605 may output a detection signal to the controller, and the controller determines whether to enable the deformation detection function based on the detection signal. The detection signal indicates whether the electronic device is worn by a user. The controller enables the deformation detection function in a case that the detection signal indicates the electronic device is worn by a user, or disables the deformation detection function in a case that the detection signal indicates the electronic device is not worn by a user. When the deformation detection function is disabled, the controller will skip signals generated from deformation detection function and will not generate a command to trigger an event in the electronic device even if the housing of the electronic device is deformed either by a user or unintentional collision.

By providing a deformation detection enabling sensor, unintentional deformation detection can be avoided. For example, when the earphone is dropped by accident or put into a bag by a user, the first wall of the earphone may be deformed by collision with the ground or other objects in the bag, and in this case, the deformation detection function of the earphone is not enabled as the deformation detection enabling sensor detects that the earphone is not worn by a user.

Another benefit of the deformation detection enabling sensor is power saving. In particular, the deformation detection function is not enabled when the deformation detection enabling sensor detects that the electronic device is not worn by a user, thereby reducing power consumption.

In an embodiment, the deformation detection enabling sensor is a capacitive sensor, which is spaced from the strain sensor group attached on the wall by a predetermined distance. In addition to avoiding false detection of deformation, the capacitive sensor may further detect a touch input on the wall by a user, and the controller may trigger a second event in the electronic device based on a combination of deformation detected by the strain sensor group and the touch input detected by the capacitive sensor. The wall, the strain sensor group and the capacitive sensor are located in the sequence as listed.

Figure 17:
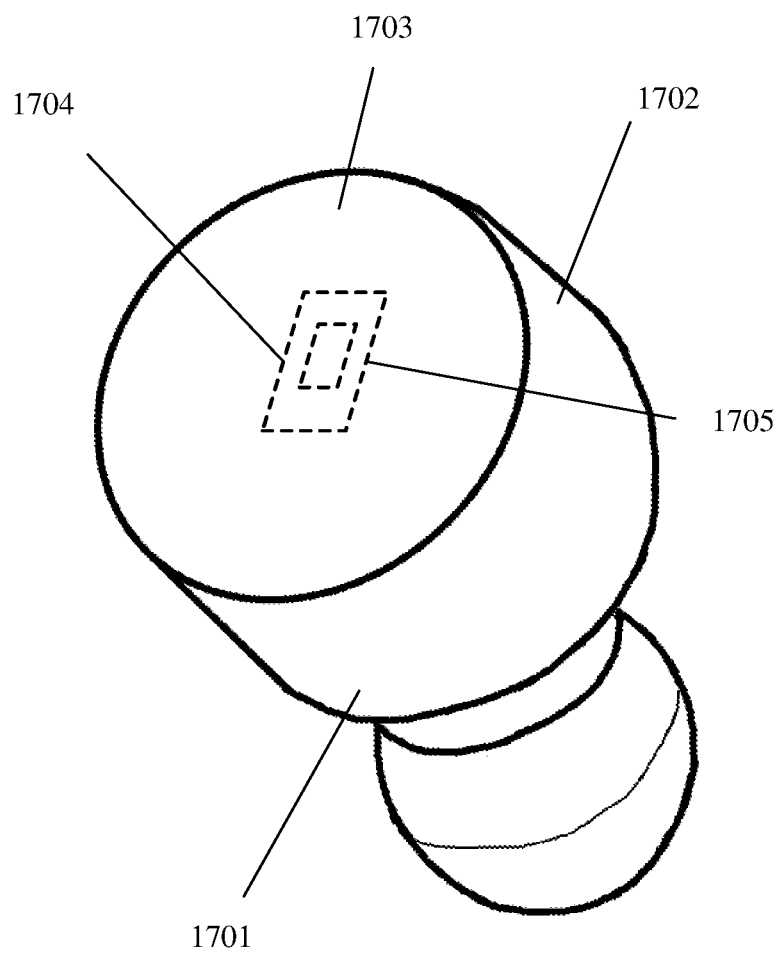
FIG. 17 is a schematic view of an electronic device according to an embodiment of the present disclosure.

As shown in FIG. 17, the electronic device includes a housing 1701, the housing 1701 has a first wall 1703 and a second wall 1702, and a stain sensor group 1704 is attached on the inside of the first wall 1703. The electronic device further includes a capacitive sensor 1705. The capacitive sensor 1705 is connected to the controller. In an embodiment, the capacitive sensor may be attached on a printed circuit board or flexible printed circuit of the electronic device inside the housing. In an embodiment, the capacitive sensor 1705 may be spaced from the strain sensor group 1704 by a predetermined distance. That is, the first wall, the strain sensor group 1704 and the capacitive sensor 1705 are located in the sequence as listed here. The capacitive sensor 1705 is configured to detect whether a human body (finger of a user) touches the first wall 1703. If the capacitive sensor 1705 does not detect that a human body touches the first wall 1703, the controller skips the signals generated from deformation detection function, thereby avoiding unintentional deformation detection as described in the above embodiment. Other than avoiding unintentional detection, other recognition patterns can be realized by the combination of the strain sensor group and the capacitive sensor, which will be described hereinafter.

In a case that the user touches the first wall but only slightly, only the capacitive sensor is detecting, and the strain sensor group is not detecting as the deformation of the first wall is not sufficient to trigger the functionality of the strain sensor group even though the deformation detection function is enabled in this case. In a case that the user pushes the housing of the electronic device, both the capacitive sensor and the strain sensor group are detecting. The capacitive sensor detects a touch input on the first wall 1703 by the user, and the strain sensor group, as described in the above embodiments, detects deformation of the first wall 1703. The capacitive sensor and the strain sensor group may generate detection signals from the touch input and the deformation of the first wall, respectively, and the controller may identify a user input based on a combination of the detection signals outputted from the capacitive sensor and the strain sensor group. The controller may trigger a second event in the electronic device in response to the user input as identified. For example, the user may long press the housing with appropriate strength to deform the first wall, the controller may determine that a long press operation is performed by the user based on an output from the capacitive sensor, and determine that the long press operation is exerted with considerable strength based on direction and magnitude of the deformation indicated by an output of the strain sensor group. The controller identifies the long press operation with force of the user, and may further trigger a second event corresponding to the identified user input based on a correspondence relationship between user inputs and second events. For example, the second event may be fast forwarding or rewinding of a song currently being played for a time period depending on a duration of the long press operation. It should be understood that the second event is different from the first event as described in the above embodiment in case of the same deformation of the first wall.

Figure 18:
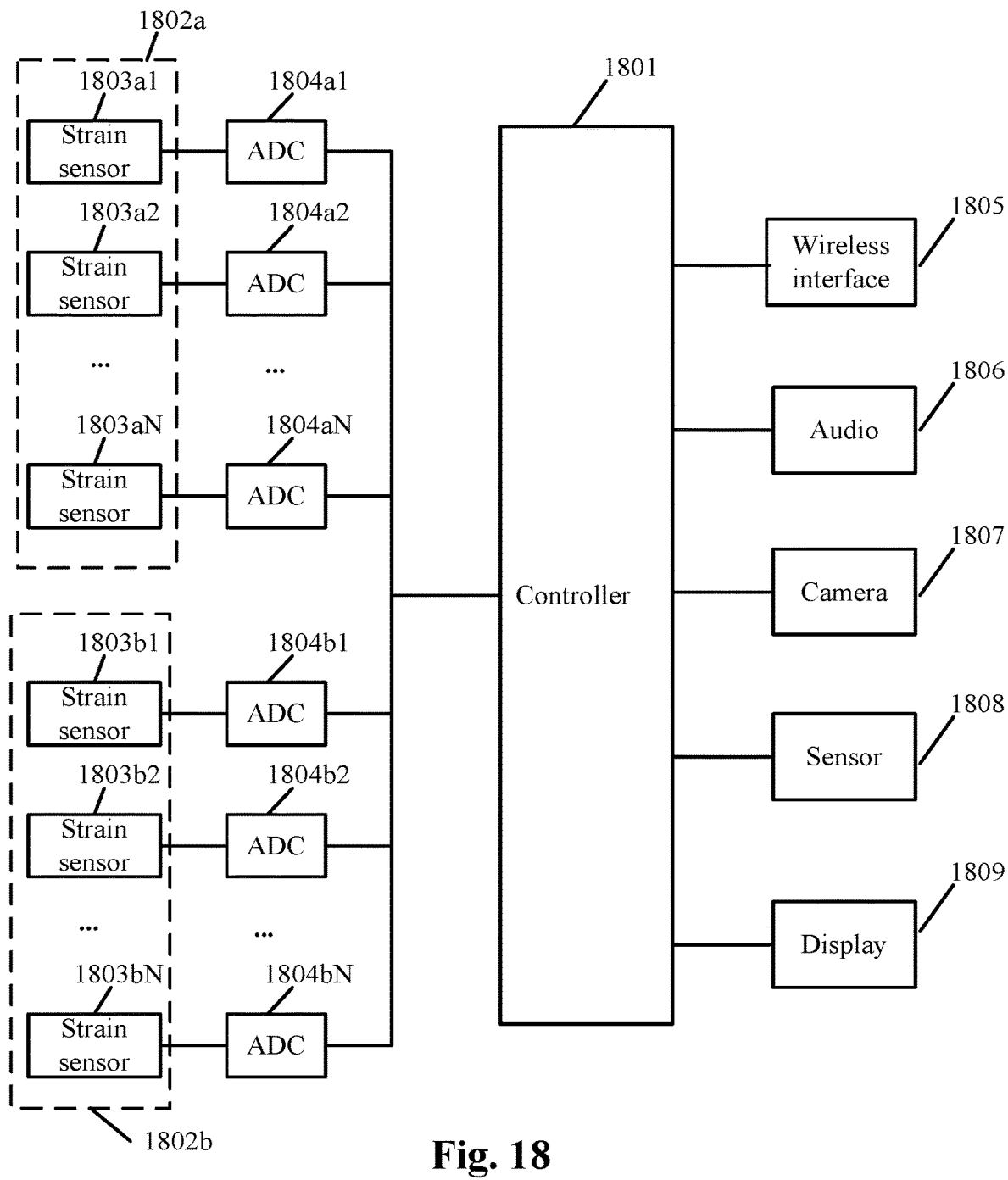
FIG. 18 is a partial schematic circuit block diagram of an electronic device according to an embodiment of the present disclosure.

An electronic device is further provided according to an embodiment of the present disclosure. As shown in FIG. 18, the electronic device includes a first strain sensor group 1802a and a second strain sensor 1802b, where the first strain sensor group 1802a includes strain sensors 1803a1 to 1803aN and the second strain sensor group 1802b includes strain sensors 1803b1 to 1803bN. The electronic device further includes analog-to-digital converters (ADC) 1804a1 to 1804aN and 1804b1 to 1804bN. The ADCs 1804a1 to 1804aN are respectively connected to the strain sensors 1803a1 to 1803aN, and the ADCs 1804b1 to 1804bN are respectively connected to the strain sensors 1803b1 to 1803bN. The electronic device further includes a controller 1801, a wireless interface 1805, an audio 1806, a camera 1807, a sensor 1808 and a display 1809. The controller is connected to all the ADCs, and the wireless interface 1805, audio 1806, camera 1807, sensor 1808 and display 1809 are all connected to the controller.

The number of strain sensors in each strain sensor group is at least one, that is, N is an integer no less than 1. Each strain sensor may amplify an analog input in order to detect a small deformation of a housing of the electronic device. Each ADC converts an analog signal from each strain sensor into a digital signal and outputs the digital signal to the controller 1801. The controller may generate a command based on the direction and magnitude of the deformation of the housing, to trigger the wireless interface 1805, audio 1806, camera 1807, sensor 1808 or display 1809 to act in response to the deformation indicating a user input, as is described in the foregoing embodiments.

The above description is for purpose of example rather than limitation, and other embodiments may be obtained by those skilled in the art based on the embodiment. For example, in some embodiments, the number of strain sensor groups may be more than two, and the electronic device includes some but not all of the wireless interface 1805, audio 1806, camera 1807, sensor 1808 and display 1809. For example, the electronic device is an earphone, and in this case, the camera 1807 may be not required in the earphone.

Figure 19:
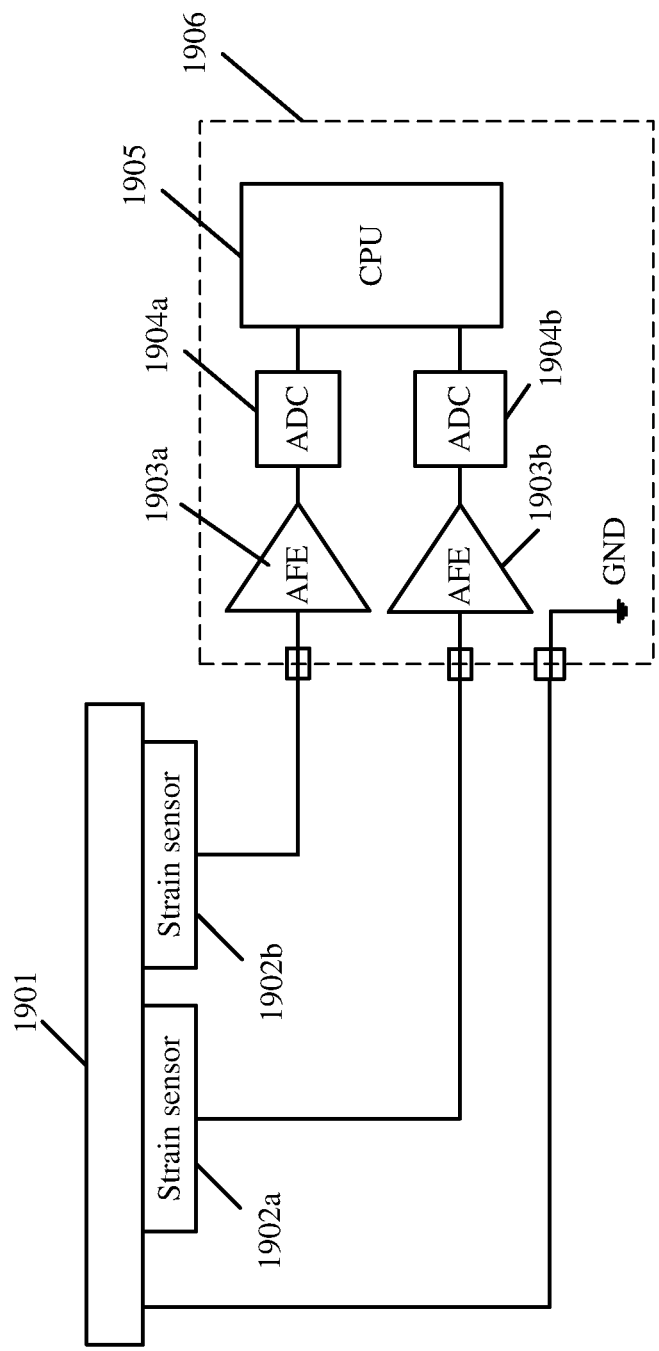
FIG. 19 is a schematic diagram of an electronic device according to an embodiment of the present disclosure.

In an embodiment based on any of the proceeding embodiments of the present disclosure, a first wall 1901 of the housing, which is attached with at least one strain sensor group, is made from a metal material and is electrically connected to a grounding terminal GND of a printed circuit board (PCB) 1906 of the electronic device, as shown in FIG. 19.

As shown in FIG. 19, a first train sensor 1902a and a second strain sensor 1902b are attached on the inside surface of the first wall 1901 of the housing. The first strain sensor 1902a is connected to ADC 1904a by analog front end (AFE) 1903a, and the second strain sensor 1902b is connected to ADC 1904b by AFE 1903b, where the AFEs 1903a and 1903b are configured to amplify the output signals from the strain sensors 1902a and 1902b, and send the amplified signals to the ADCs 1904a and 1904b, respectively. ADCs 1904a and 1904b are connected to the controller which in this embodiment may be a central processing unit (CPU) 1905. The PCB 1906 includes a grounding terminal GND, and the first wall 1901 of the housing is electronically connected to the grounding terminal GND of the PCB 1906. Although FIG. 19 shows that the AFEs 1903a and 1903b, ADCs 1904a and 1904b, and the CPU 1905 are all mounted on the PCB 1906, it is understandable that in other embodiments of the present disclosure, the electronic device may include more than one PCB, and the AFEs, ADCs and the CPU may be mounted on different PCBs in a way as deemed appropriate by those skilled in the art. In the case of multiple PCBs, each of the multiple PCB may include a grounding terminal GND and the grounding terminals GND of the multiple PCBs may be connected to each other in an embodiment. It should be noted here that two strain sensors are shown in FIG. 19 for purpose of example, and it is well understood that the number of the strain sensors may be less than or greater than two in other embodiments of the present disclosure.

In an embodiment, the first wall of the housing is electronically connected to the grounding terminal GND of the PCB by means of a spring, a pogo pin connector, crimping, snap fit connection, welding, a screw or soldering.

In an embodiment, the metal material forming the first wall may be one of more of stainless steel, aluminum, copper or magnesium alloy.

By connecting the housing to the grounding terminal GND of the PCB, noise signals are shunted to the grounding terminal and decoupled from the output of the strain sensors, thereby improving the performance of the electronic device.

In practical application, for better noise reduction performance, the housing of the electronic device should be low-impedance for operating frequency of the strain sensor which is lower than 10 KHz.

Figure 20:
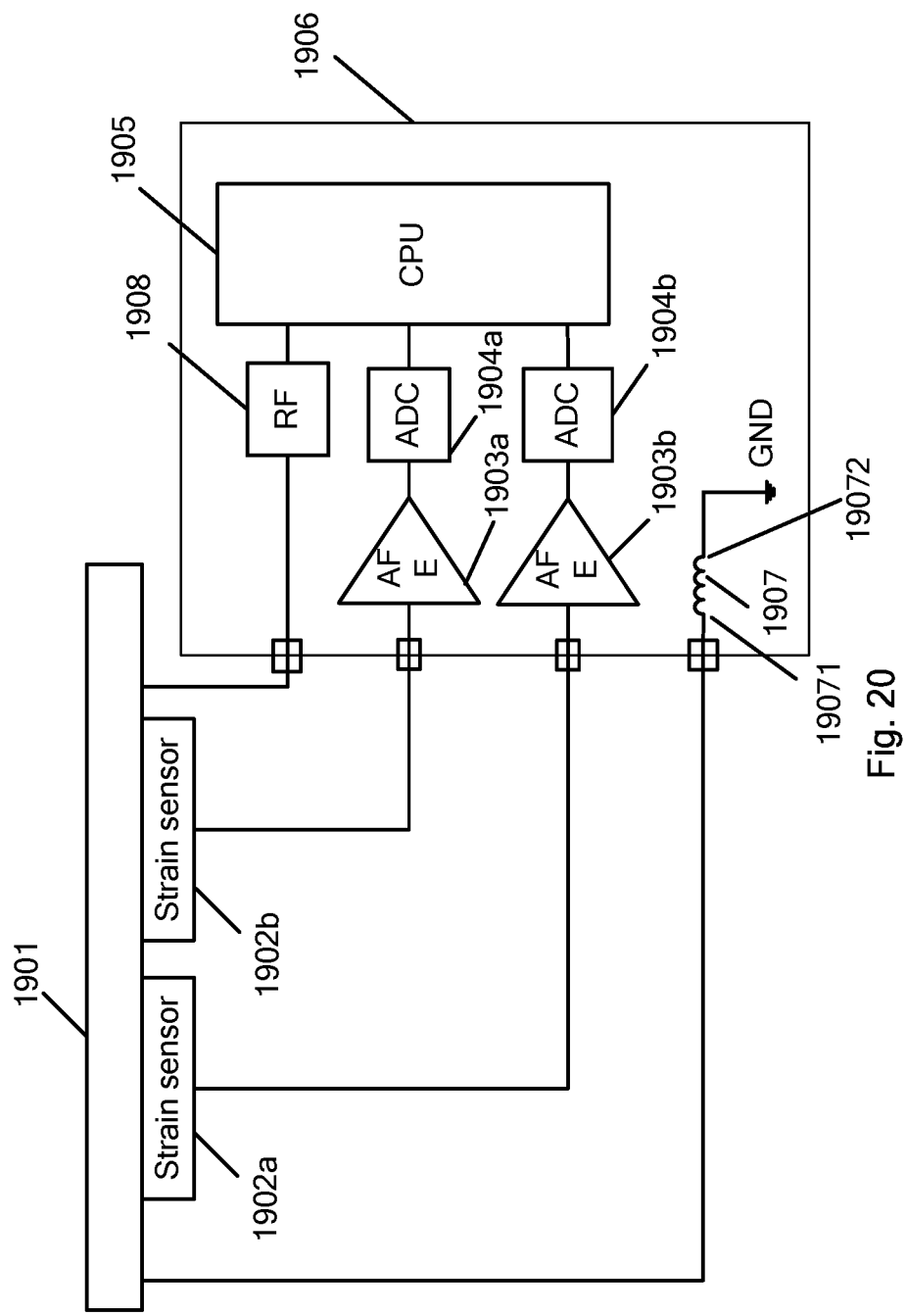
FIG. 20 is a schematic diagram of an electronic device according to an embodiment of the present disclosure.

Accordingly, in an embodiment based on the foregoing embodiment, as shown in FIG. 20, the first wall 1901 of the housing of the electronic device is electrically connected to the grounding terminal GND of the PCB 1906 by an inductor 1907, where a first terminal 19071 of the inductor 1907 is connected to the first wall 1901 of the housing and a second terminal 19072 of the inductor 1907 is connected to the grounding terminal GND of the PCB 1906. In the embodiment, an inductance of the inductor 1907 is lower than 1 µH.

By connecting the first wall of the housing to the grounding terminal GND of the PCB by a low-impedance inductor, noise signals at frequency lower than 10 KHz can be better shunted to the grounding terminal and decoupled from the output of the strain sensor.

Figure 21:
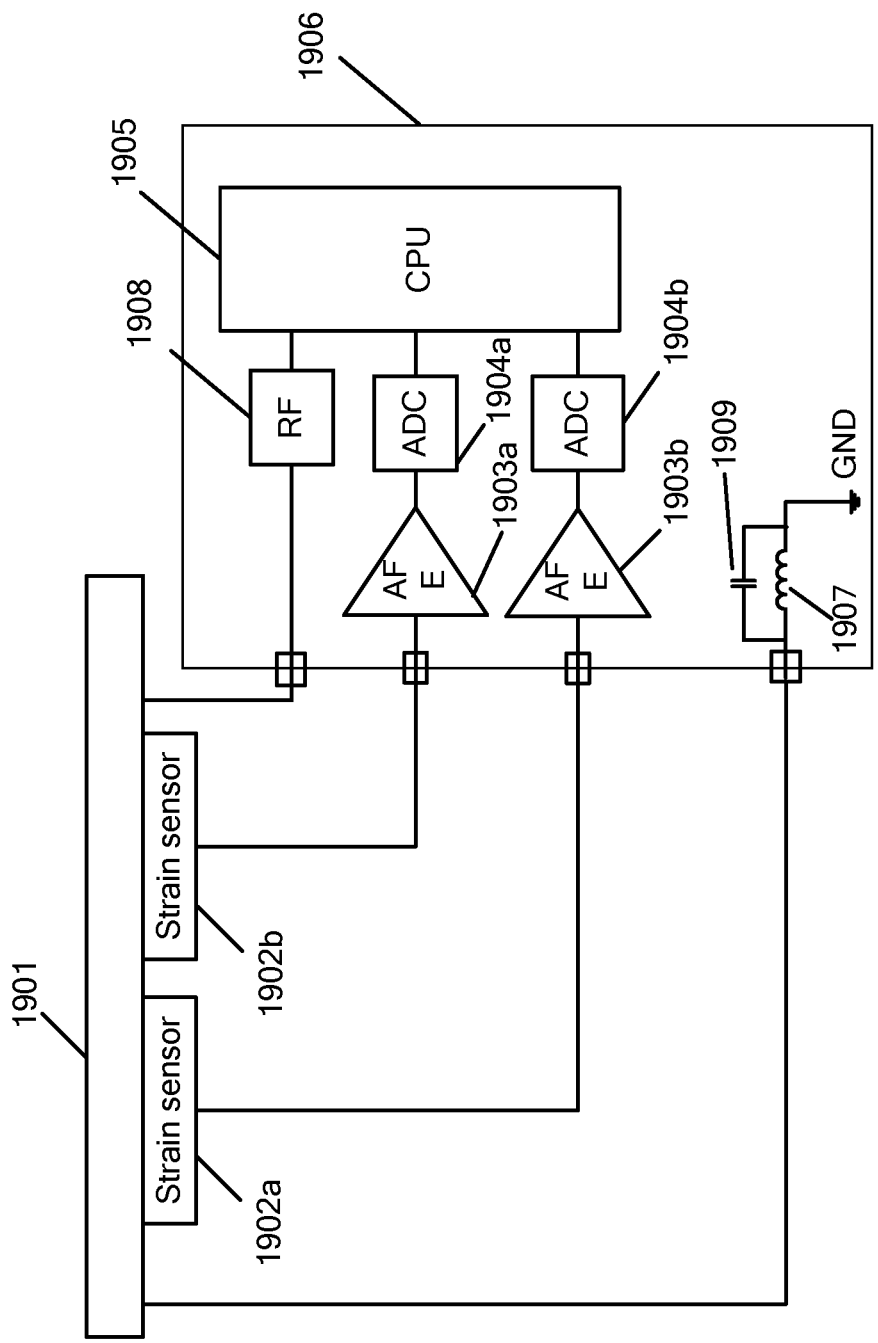
FIG. 21 is a schematic diagram of an electronic device according to an embodiment of the present disclosure.

In an embodiment, in order to further reduce the impedance of the connection between the housing and the grounding terminal, a capacitor 1909 may be connected across the first terminal 19071 and the second terminal 19072 of the inductor 1907, as shown in FIG. 21, that is, the capacitor is connected in parallel with the inductor 1907.

Figure 22:
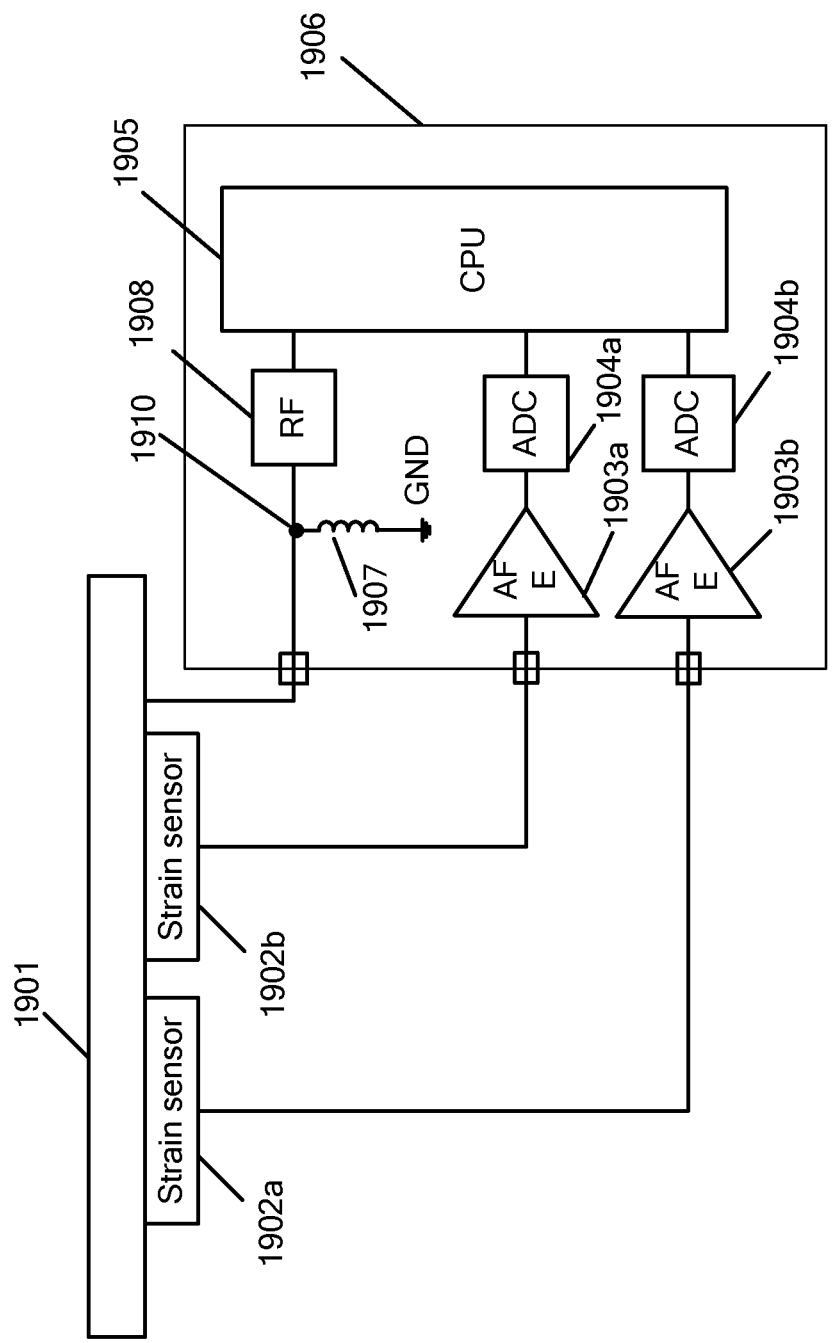
FIG. 22 is a schematic diagram of an electronic device according to an embodiment of the present disclosure.

In some embodiments, the housing made from metal may be connected to a radio frequency circuit in the electronic device so as to function as an antenna of the electronic device to receive and transmit radio frequency signals. Accordingly, in an embodiment based on any of the foregoing embodiments, the electronic device further includes a radio frequency (RF) circuit 1908 electrically connected to the first wall 1901 of the housing and the CPU 1905, as shown in FIGS. 20 to 22. As can be seen from FIGS. 20 to 22, one terminal of the RF circuit 1908 is connected to the first wall 1901 and another terminal of the RF circuit 1908 is connected to the CPU 1905.

It is shown in FIGS. 20 and 21 that the first wall 1901 of the housing is connected to the grounding terminal GND and the RF circuit 1908 by two respective links, that is, a dedicated link to connect the first wall 1901 to the grounding terminal GND of the PCB 1906 is established. In the embodiment as shown in FIG. 22, in order to reduce the number of wires connected to the housing, the first terminal 19071 of the inductor 1907, the first wall 1901 of the housing and the RF circuit 1908 may be connected to a common connection point 1910, where the inductor 1907 in this embodiment may be referred to as a shunt inductor. The common connection point 1910 is located between the first wall 1901, the first terminal 19071 of the inductor 1907 and the RF circuit 1908 on the PCB 1906, and the first wall 1901, the first terminal 19071 and the RF circuit 1908 are jointed at the common connection point 1910. The first terminal 19071 of the inductor 1907 is connected to the common connection point 1910 so as to be further connected to the first wall 1901 of the housing, that is, the first terminal 19071 of the inductor 1907 is electrically connected to the first wall 1901 of the housing via the common connection point 1910. The RF circuit 1908 is also connected to the common connection point 1910 so as to be further connected to the first wall 1901, that is, the RF circuit 1908 is also electrically connected to the first wall 1901 of the housing via the common connection point 1910. In this way, the dedicated link for connecting the housing to the grounding terminal GND is saved, thereby simplifying the wiring of the housing of the electronic device.

In the embodiment as shown in FIG. 22, the electronic device may also further includes a capacitor connected across the first terminal and the second terminal of the inductor, and reference can be made to FIG. 21 for how to connect the capacitor in parallel with the inductor as shown in FIG. 22, which is not elaborated herein for purpose of brevity.

Regardless of whether the housing functions as an antenna of the electronic device intentionally or unintentionally, the first wall, when made from a metal material, is connected to the grounding terminal of the PCB so as to decouple noise signals picked up by the housing from the output of the strain sensor group, thereby improving the performance of the controller when triggering a control event corresponding to the deformation of the first wall.

Figure 23:
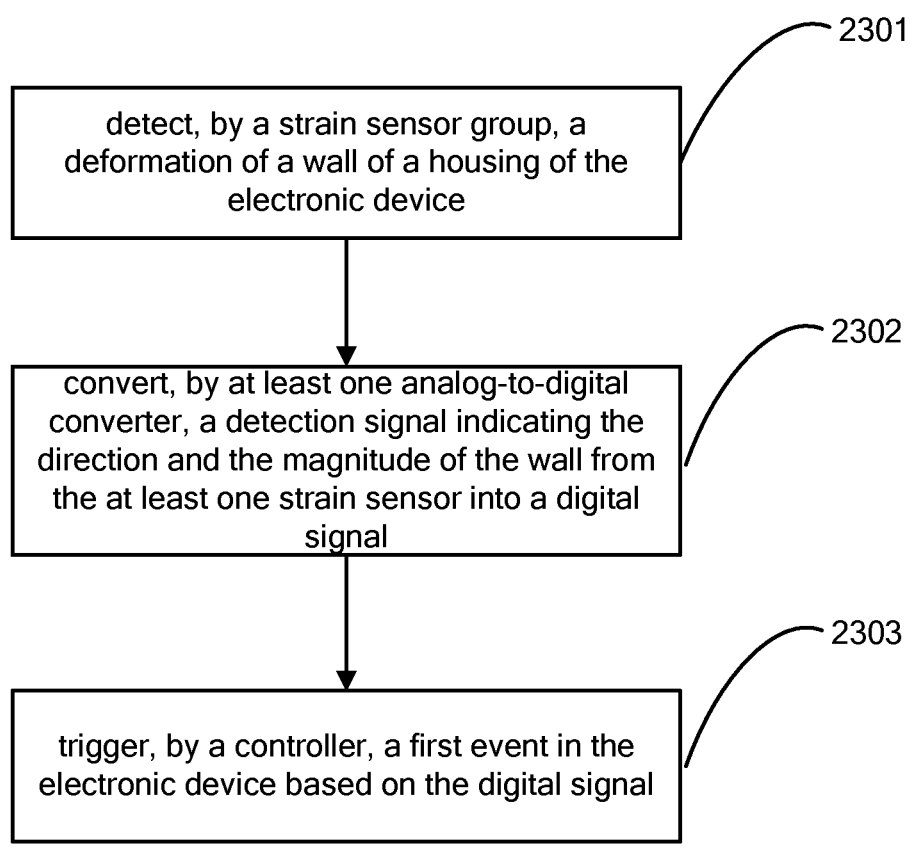
FIG. 23 is a flowchart of an input method for an electronic device according to an embodiment of the present disclosure.

As described above, a user input can be identified by the electronic device as described above. Accordingly, an input method for an electronic device is provided according to an embodiment of the present disclosure. As shown in FIG. 23, the input method includes steps 2301 to 2303.

Step 2301 includes detecting, by a strain sensor group, a deformation of a wall of a housing of the electronic device. The strain sensor group includes at least one strain sensor each configured to detect the deformation of the wall in a single direction, the deformation involves a direction and a magnitude, and the direction is a deformation-sensitive direction.

Step 2302 includes converting, by at least one analog-to-digital converter, a detection signal indicating the direction and the magnitude of the wall from the at least one strain sensor into a digital signal.

Step 2303 includes triggering, by a controller, a first event in the electronic device based on the digital signal.

In order to avoid unintentional deformation detection for example in a case that the electronic device dropped by accident or put into a bag by a user, in an embodiment, the input method for an electronic device further includes detecting, by a deformation detection enabling sensor connected to a controller, whether the electronic device is worn by a user. In a case that the electronic device is worn by the user, the detection of deformation of the wall is enabled. In a case that the electronic device is not worn by the user, the detection of deformation of the wall is disabled. The deformation detection enabling sensor may be a temperature sensor, an infrared sensor or a capacitive sensor.

In an embodiment, the deformation detection enabling sensor is a capacitive sensor, and the capacitive sensor is spaced from the strain sensor group attached on the wall by a predetermined distance and further configured to detect a touch input on the wall by a user. The input method for an electronic device further includes: detecting, by the capacitive sensor, a touch input on the wall by a user; and triggering, by the controller, a second event in the electronic device based on a combination of deformation detected by the strain sensor group and the touch input detected by the capacitive sensor.

In an embodiment, the number of the digital signal is at least two, and step 2303 of the input method for an electronic device includes: determining one of deformation cases according to a correspondence relationship between the deformation cases and the at least two digital signals; and triggering the first event corresponding to the deformation case.

The methods are only briefly described as reference can be made to the foregoing embodiments of the electronic device for implementation.

It should be understood that in the embodiments according to the present disclosure, the disclosed apparatus and method may be implemented in other manners. For example, the apparatus embodiments described above are merely illustrative. For example, the division of the units is only a logical function division, and in practical implementation, there may be another manner of division. For example, multiple units or components may be combined or integrated into another system, or some features can be ignored or not implemented. In addition, the mutual coupling or direct coupling or communication connection shown or discussed may be implemented with some interfaces, and indirect coupling or communication connection between apparatuses or units may be electrical, mechanical or in other forms.

The units described as separate components may or may not be physically separated, and the components shown as units may or may not be physical units, that is, they may be located in one place or distributed to multiple network units. Some or all of the units may be selected according to practical needs to achieve the objective of the technical solutions of the embodiments.

In addition, functional units in various embodiments of the present disclosure may be integrated into one processing unit, or each unit may exist physically separately, or two or more units may be integrated into one unit.

Those skilled in the art will well appreciate that all or part of the processes of the methods according to the above embodiments can be implemented by related hardware under the control of a computer program, and the program may be stored in a computer readable storage medium and implement the processes of the methods according to the above embodiments. The storage medium may be a magnetic disk, an optical disk, a read-only memory (Read-Only Memory, ROM), or a random access memory (Random Access Memory, RAM).

The foregoing shows only some specific embodiments of the present disclosure, but the protection scope of the present disclosure is not limited thereto. Those skilled in the art can easily think of changes or substitutions within the technical scope disclosed in the present disclosure. The changes or substitutions shall fall within the protection scope of the present disclosure.

The invention claimed is:

1. An electronic device, comprising:
a housing comprising a wall;
a strain sensor group comprising at least one strain sensor attached on the wall, wherein each of the at least one strain sensor is configured to detect a deformation of the wall in a single direction, the deformation involves a direction and a magnitude, and the direction is a deformation-sensitive direction, wherein the at least one strain sensor comprises N strain sensors, wherein N is an integer equal to or greater than 2, the N strain sensors detect the deformation of the wall in N directions, respectively, and an angle between each two adjacent directions of the N directions is 180/N degrees; and
at least one analog-to-digital converter, which has an input terminal connected to an output terminal of the at least one strain sensor and has an output terminal connected to a controller, the at least one analog-to-digital converter is configured to convert a detection signal indicating the direction and the magnitude of the wall from the at least one strain sensor into a digital signal; and
the controller configured to trigger a first event in the electronic device based on the digital signal,
wherein the wall of the housing is electrically connected to a grounding terminal of a printed circuit board (PCB) of the electronic device by an inductor, the inductor has a first terminal connected to the wall of the housing and a second terminal connected to the grounding terminal of the PCB,
wherein the electronic device further comprises a capacitor electronically connected across the first terminal and the second terminal of the inductor.

2. The electronic device according to claim 1, wherein the at least one strain sensor is attached on inside of the wall.

3. The electronic device according to claim 1, wherein the wall comprises a first portion with a first thickness and a second portion with a second thickness, wherein the first thickness is smaller than the second thickness, and
the strain sensor group is attached on the first portion.

4. The electronic device according to claim 3, wherein the shape of the first portion is a cross shape with a crossing located at the center of the wall.

5. The electronic device according to claim 1, wherein, the housing is made from one or more of a group of plastic, glass, wood, ceramic, metal and leather.

6. The electronic device according to claim 1, further comprising:
a deformation detection enabling sensor connected to the controller and configured to detect that the electronic device is worn by a user, based on which the detection of deformation of the wall is enabled.

7. The electronic device according to claim 6, wherein the deformation detection enabling sensor is a capacitive sensor, the capacitive sensor is spaced from the strain sensor group attached on the wall by a predetermined distance and further configured to detect a touch input on the wall by a user, and the controller is configured to trigger a second event in the electronic device based on a combination of deformation detected by the strain sensor group and the touch input detected by the capacitive sensor, wherein the wall, the strain sensor group and the capacitive sensor are located in the sequence as listed.

8. The electronic device according to claim 1, wherein the number of strain sensor group is more than one, and the more than one strain sensor group is arranged on the wall in a uniform manner.

9. The electronic device according to claim 1, wherein
each of the at least one analog-to-digital converter comprises at least two comparators having different reference voltages, and outputs at least two digital signals to the controller, and
the controller is configured to:
determine one of deformation cases according to a correspondence relationship between the deformation cases and the at least two digital signals; and
trigger the first event corresponding to the deformation case.

10. The electronic device according to claim 1, further comprising:
a low power microcontroller unit connected between the at least one analog-to-digital converter and the controller, configured to process the digital signal and transmit the processed digital signal to the controller,
wherein the controller triggers the first event based on the processed digital signal.

11. The electronic device according to claim 1, wherein the wall of the housing is made of a metal material.

12. The electronic device according to claim 11, wherein an inductance of the inductor is lower than 1 µH.

13. The electronic device according to claim 12, further comprising a radio frequency (RF) circuit, wherein the RF circuit is electrically connected to the wall of the housing via a connection point between the first terminal of the inductor and the wall of the housing.

* * * * *